US009829594B2

(12) United States Patent
Ray et al.

(10) Patent No.: US 9,829,594 B2
(45) Date of Patent: *Nov. 28, 2017

(54) OCEAN BOTTOM SEISMOMETER PACKAGE

(71) Applicant: Fairfield Industries, Inc., Sugar Land, TX (US)

(72) Inventors: Clifford H. Ray, Fulshear, TX (US); Glenn D. Fisseler, Houston, TX (US); James N. Thompson, Sugar Land, TN (US); Hal B. Haygood, Sugar Land, TX (US)

(73) Assignee: FAIRFIELD INDUSTRIES, INC., Sugar Land, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/526,333

(22) Filed: Oct. 28, 2014

(65) Prior Publication Data
US 2015/0049584 A1    Feb. 19, 2015

Related U.S. Application Data

(60) Continuation of application No. 13/565,445, filed on Aug. 2, 2012, now Pat. No. 8,879,362, which is a
(Continued)

(51) Int. Cl.
*G01V 1/38* (2006.01)
*G01V 1/24* (2006.01)
*G01V 1/16* (2006.01)

(52) U.S. Cl.
CPC ............ *G01V 1/3808* (2013.01); *G01V 1/247* (2013.01); *G01V 1/3852* (2013.01); *G01V 1/166* (2013.01);
(Continued)

(58) Field of Classification Search
CPC .... G01V 1/247; G01V 1/3808; G01V 1/3852; G01V 1/166; G01V 1/38; G01V 2210/1427; Y10T 24/39
(Continued)

(56) References Cited

U.S. PATENT DOCUMENTS 2,551,417 A    5/1951  Carlisle
2,824,183 A    2/1958  Marasco et al.
(Continued)

FOREIGN PATENT DOCUMENTS

GB    2 275 337    8/1994
GB    2 395 273    5/2004
(Continued)

OTHER PUBLICATIONS

USPTO translation of JP04096088, Watanabe et al., 14 pages.*
(Continued)

*Primary Examiner* — Daniel L Murphy
(74) *Attorney, Agent, or Firm* — Foley & Lardner LLP; James De Vellis

(57) ABSTRACT

A marine seismic exploration method and system comprised of continuous recording, self-contained ocean bottom pods characterized by low profile casings. An external bumper is provided to promote ocean bottom coupling and prevent fishing net entrapment. Pods are tethered together with flexible, non-rigid, non-conducting cable used to control pod deployment. Pods are deployed and retrieved from a boat deck configured to have a storage system and a handling system to attach pods to cable on-the-fly. The storage system is a juke box configuration of slots wherein individual pods are randomly stored in the slots to permit data extraction, charging, testing and synchronizing without opening the pods. A pod may include an inertial navigation system to determine ocean floor location and a rubidium clock for
(Continued)

timing. The system includes mathematical gimballing. The cable may include shear couplings designed to automatically shear apart if a certain level of cable tension is reached.

20 Claims, 12 Drawing Sheets

Related U.S. Application Data continuation of application No. 13/533,011, filed on Jun. 26, 2012, now abandoned, which is a continuation of application No. 13/166,586, filed on Jun. 22, 2011, now Pat. No. 8,228,761, which is a continuation of application No. 12/838,859, filed on Jul. 19, 2010, now Pat. No. 7,990,803, which is a division of application No. 12/004,817, filed on Dec. 21, 2007, now Pat. No. 7,804,737, which is a continuation of application No. 11/592,584, filed on Nov. 3, 2006, now Pat. No. 7,724,607, which is a division of application No. 10/448,547, filed on May 30, 2003, now Pat. No. 7,310,287.

(52) U.S. Cl.
CPC ........ *G01V 1/38* (2013.01); *G01V 2210/1427* (2013.01); *Y10T 24/39* (2015.01)

(58) Field of Classification Search
USPC .................................................. 367/15, 188
See application file for complete search history.

(56) References Cited

U.S. PATENT DOCUMENTS

| | | |
|---|---|---|
| 3,297,982 A | 1/1967 | Allan |
| 3,670,988 A | 6/1972 | Leonard |
| 3,921,124 A | 11/1975 | Payton |
| 4,055,138 A | 10/1977 | Klein |
| 4,063,213 A | 12/1977 | Itria et al. |
| 4,087,780 A | 5/1978 | Itria et al. |
| 4,134,635 A | 1/1979 | Roche |
| 4,144,520 A | 3/1979 | McNeel |
| 4,222,164 A | 9/1980 | Triebwasser |
| 4,281,403 A | 7/1981 | Siems et al. |
| 4,293,936 A | 10/1981 | Cox et al. |
| 4,300,220 A | 11/1981 | Goff et al. |
| 4,380,059 A | 4/1983 | Ruehle |
| 4,422,164 A | 12/1983 | Bowden et al. |
| 4,458,339 A | 7/1984 | Wason |
| 4,462,094 A | 7/1984 | Bowden et al. |
| 4,486,865 A | 12/1984 | Ruehle |
| 4,525,819 A | 6/1985 | Hefer |
| 4,613,821 A | 9/1986 | Sternberg et al. |
| 4,616,320 A | 10/1986 | Kerr et al. |
| 4,666,338 A | 5/1987 | Schoepf |
| 4,682,094 A | 7/1987 | Kuroiwa |
| 4,692,906 A | 9/1987 | Neeley |
| 4,711,194 A | 12/1987 | Fowler |
| 4,729,333 A | 3/1988 | Kirby et al. |
| 4,764,908 A | 8/1988 | Greer, Jr. |
| 4,780,863 A | 10/1988 | Schoepf |
| 4,813,029 A | 3/1989 | Erich et al. |
| 4,839,872 A | 6/1989 | Gragnolati et al. |
| 4,849,947 A | 7/1989 | Baule et al. |
| 4,872,114 A | 10/1989 | De Montmollin et al. |
| 4,884,248 A | 11/1989 | Laster et al. |
| 4,979,150 A | 12/1990 | Barr |
| 5,003,517 A | 3/1991 | Greer, Jr. |
| 5,010,531 A | 4/1991 | McNeel |
| 5,067,112 A | 11/1991 | Meek et al. |
| 5,119,345 A | 6/1992 | Woo et al. |
| 5,138,538 A | 8/1992 | Sperling |
| 5,163,028 A | 11/1992 | Barr et al. |
| 5,189,642 A | 2/1993 | Donoho et al. |
| 5,191,526 A | 3/1993 | Laster et al. |
| 5,214,614 A | 5/1993 | Baule |
| 5,231,252 A | 7/1993 | Sansone |
| 5,253,223 A | 10/1993 | Svenning et al. |
| 5,274,605 A | 12/1993 | Hill |
| 5,353,223 A | 10/1994 | Norton et al. |
| 5,365,492 A | 11/1994 | Dragoset, Jr. |
| 5,432,895 A | 7/1995 | Myers |
| 5,469,408 A | 11/1995 | Woo |
| 5,500,832 A | 3/1996 | Berryhill |
| 5,532,975 A | 7/1996 | Elholm |
| 5,548,562 A | 8/1996 | Helgerud et al. |
| 5,550,786 A | 8/1996 | Allen |
| 5,555,220 A | 9/1996 | Minto |
| 5,623,455 A | 4/1997 | Norris |
| 5,624,207 A | 4/1997 | Berges |
| 5,655,753 A | 8/1997 | Berges et al. |
| 5,671,344 A | 9/1997 | Stark |
| 5,724,241 A | 3/1998 | Wood et al. |
| 5,761,152 A | 6/1998 | Jacobsen et al. |
| 5,774,417 A | 6/1998 | Corrigan et al. |
| 5,902,072 A | 5/1999 | Berges |
| 5,930,730 A | 7/1999 | Marfurt et al. |
| 5,937,782 A | 8/1999 | Rau |
| 5,963,507 A | 10/1999 | Barr et al. |
| 6,002,640 A | 12/1999 | Harmon |
| 6,012,018 A | 1/2000 | Hornbuckle |
| 6,021,090 A | 2/2000 | Gaiser et al. |
| 6,024,344 A | 2/2000 | Buckley et al. |
| 6,049,507 A | 4/2000 | Allen |
| 6,070,129 A | 5/2000 | Grouffal et al. |
| 6,101,448 A | 8/2000 | Ikelle et al. |
| 6,141,622 A | 10/2000 | Keller et al. |
| 6,151,556 A | 11/2000 | Allen |
| 6,170,601 B1 | 1/2001 | Nakajima et al. |
| 6,208,247 B1 | 3/2001 | Agre et al. |
| 6,215,499 B1 | 4/2001 | Neff et al. |
| 6,292,754 B1 | 9/2001 | Thomsen |
| 6,307,808 B1 | 10/2001 | Schmidt |
| 6,314,371 B1 | 11/2001 | Monk |
| 6,353,577 B1 | 3/2002 | Orban et al. |
| 6,366,537 B1 | 4/2002 | Sambuelli et al. |
| 6,430,105 B1 | 8/2002 | Stephen |
| 6,474,254 B1 | 11/2002 | Ambs et al. |
| 6,532,190 B2 | 3/2003 | Bachrach |
| 6,584,038 B2 | 6/2003 | Meunier |
| 6,584,406 B1 | 6/2003 | Harmon et al. |
| 6,590,831 B1 | 7/2003 | Bennett et al. |
| 6,607,050 B2 | 8/2003 | He et al. |
| 6,625,083 B2 | 9/2003 | Vandenbroucke |
| 6,657,921 B1 | 12/2003 | Ambs |
| 6,691,038 B2 | 2/2004 | Zajac |
| 6,735,630 B1 | 5/2004 | Gelvin et al. |
| 6,738,715 B2 | 5/2004 | Shatilo et al. |
| 6,751,162 B2 | 6/2004 | Dominguez et al. |
| 6,791,901 B1 | 9/2004 | Robertsson et al. |
| 6,814,179 B2 | 11/2004 | Corrigan et al. |
| 6,816,434 B2 | 11/2004 | Jones |
| 6,850,462 B2 | 2/2005 | McDaniel et al. |
| 6,912,903 B2 | 7/2005 | Hamblen et al. |
| 6,932,185 B2 * | 8/2005 | Bary .................. G01V 1/38 181/110 |
| 6,934,219 B2 | 8/2005 | Burkholder et al. |
| 6,951,138 B1 * | 10/2005 | Jones ................ G01V 1/3852 367/159 |
| 6,977,867 B2 | 12/2005 | Chamberlain |
| 7,016,260 B2 | 3/2006 | Bary |
| 7,021,146 B2 | 4/2006 | Nash et al. |
| 7,073,405 B2 | 7/2006 | Rioux |
| 7,085,196 B2 | 8/2006 | Nemeth |
| 7,124,028 B2 | 10/2006 | Ray et al. |
| 7,203,130 B1 | 4/2007 | Welker |
| 7,218,890 B1 | 5/2007 | Iseli et al. |
| 7,225,662 B2 | 6/2007 | Kamata |
| 7,254,093 B2 | 8/2007 | Ray et al. |
| 7,310,287 B2 | 12/2007 | Ray et al. |
| 7,324,406 B2 | 1/2008 | Berg |
| 7,400,552 B2 | 7/2008 | Moldoveanu et al. |

(56) References Cited

U.S. PATENT DOCUMENTS

| | | | |
|---|---|---|---|
| 7,561,493 | B2 | 7/2009 | Ray et al. |
| 7,577,060 | B2 | 8/2009 | Toennessen et al. |
| 7,755,970 | B2 | 7/2010 | Welker et al. |
| 7,804,738 | B2 | 9/2010 | Storteig et al. |
| 7,859,945 | B2 | 12/2010 | Sallas et al. |
| 7,957,220 | B2 | 6/2011 | Howlid et al. |
| 7,986,589 | B2 | 7/2011 | Ray et al. |
| 8,014,229 | B2 | 9/2011 | Meunier et al. |
| 8,228,761 | B2 | 7/2012 | Ray et al. |
| 8,391,102 | B2 | 3/2013 | Holo |
| 8,547,782 | B2 | 10/2013 | Howlid et al. |
| 8,570,830 | B2 | 10/2013 | Storteig et al. |
| 8,824,239 | B2 | 9/2014 | Welker et al. |
| 8,879,362 | B2 | 11/2014 | Ray et al. |
| RE45,268 | E | 12/2014 | Ray et al. |
| 9,304,222 | B2 | 4/2016 | Ni et al. |
| 2002/0175020 | A1 | 11/2002 | Corrigan et al. |
| 2002/0193947 | A1 | 12/2002 | Chamberlain |
| 2003/0109989 | A1 | 6/2003 | Bagaini et al. |
| 2003/0202424 | A1 | 10/2003 | Burkholder et al. |
| 2004/0073373 | A1 | 4/2004 | Wilson |
| 2005/0144795 | A1 | 7/2005 | Tanner |
| 2005/0246137 | A1 | 11/2005 | Brinkman et al. |
| 2007/0247971 | A1 | 10/2007 | Semb et al. |
| 2009/0092005 | A1 | 4/2009 | Goujon et al. |
| 2013/0155805 | A1 | 6/2013 | Tonchia |

FOREIGN PATENT DOCUMENTS

| | | |
|---|---|---|
| GB | 2 414 804 B | 1/2008 |
| JP | 62-288594 | 12/1987 |
| JP | 04-096088 | 8/1992 |
| JP | 06-194193 | 7/1994 |
| JP | 06-208695 | 7/1994 |
| JP | 2000-205898 A | 7/2000 |
| JP | 2002-071823 A | 3/2002 |
| WO | WO-97/10461 A1 | 3/1997 |
| WO | WO-98/07050 | 2/1998 |
| WO | WO-99/35513 | 7/1999 |
| WO | WO-01/96672 A1 | 12/2001 |
| WO | WO-02/37140 A2 | 5/2002 |
| WO | WO-03/062750 A1 | 7/2003 |
| WO | WO-2004/053526 | 6/2004 |
| WO | WO-2004/065988 | 8/2004 |
| WO | WO-2005/096018 | 10/2005 |

OTHER PUBLICATIONS

USPTO translation of JP06194193 Monma et al., 26 pages.*
USPTO translation of JP06208695 Monma et al, 33 pages.*
USPTO translation of JP2000-205898 Yasunori et al , 10 pages.*
USPTO translation of JP2002-071823 Takahashi et al, 13 pages.*
Office Action in Canadian Application No. 2,554,788 dtd Oct. 27, 2014 (5 pages).
Second Office Action in Chinese Application No. 201210243445.3 dated Feb. 28, 2015. (English translation—6 pages).
Third Office Action in Chinese Application No. 201110436777.9 dated Feb. 25, 2015. (English translation—6 pages).
Office Action on CN 201210243445.3 issued Mar. 18, 2016 with English translation.
US Office Action on U.S. Appl. No. 14/555,122 dated Mar. 3, 2016.
Geophysical Technology, Inc., NuSeis Product Line, NRU 1C, Dec. 29, 2014, 3 pages. http://www.geophysicaltechnology.com/products.htm.
Non-Final Office Action in U.S. Appl. No. 14/555,122 dtd Apr. 17, 2015 (42 pages).
Buttgenbach, Dr. Thomas, Schleisiek Klaus, "4-C System Goes Ultradeep," Hart's E&P, Houston, Texas/United States of America, Jan. 2002, 3 pages.
Canadian Office Action DTD May 24, 2013 for Application No. 2581193, filed Mar. 20, 2007, 3 pages.
Canadian Office Action DTD Aug. 1, 2012 for Application No. 2554788, filed Jul. 27, 2006, 3 pages.
Final Office Action in U.S. Appl. No. 13/565,445 dtd Mar. 20, 2014, 11 pages.
First Examination Report for European Patent Application No. 04809786.9 dated Sep. 9, 2013, 3 pages.
GeoPro GMBH, "WARRP Offshore," GeoPro GmbH, Hamburg/Germany, Mar. 2002, 2 pages.
Notice of Allowance in U.S. Appl. No. 13/952,135 dtd Oct. 6, 2014 (5 pages).
Notification of the First Office Action in Chinese Application No. 201110436777.9 dated Feb. 28, 2014, 7 pages.
Office Action in Chinese Application No. 201210243445.3 dated Jun. 17, 2014.
Seabed Geophysical AS, "CASE, Cable-less Seismic System," SeaBed Geophysical AS, Trodheim/Norway, 8 pages.
Second Office Action in Chinese Application No. 201110436777.9 dated Sep. 3, 2014 (16 pages).
Thales Underwater Systems, "Reservoir Monitoring Solutions," Thales, Jan. 2003, 18 pages.
Non-Final Office Action dated Dec. 19, 2013 in U.S. Appl. No. 13/952,135, 12 pages.
Non-Final Office Action dated Dec. 19, 2013 in U.S. Appl. No. 13/952,135, filed Jul. 26, 2013, 12 pages.
Office Action dated Jul. 12, 2013 in U.S. Appl. No. 13/565,445, filed Aug. 2, 2012, 4 pages.
Notice of Allowance in U.S. Appl. No. 13/565,445 dated Jul. 8, 2014 (5 pages).
Chinese Office Action issued Aug. 28, 2015 for CN 201210243453.
Hansen, et al., 'Innovations in Time', First Break, vol. 25, No. 6, Jun. 2007, only five sentence summary submitted, and considered.
Office Action for Canadian Patent Application. 2,887,400, dated Aug. 2, 2016.
Paulsen, et al. 'Improved Marine 4D Repeatability Using an Automated Vessel, Source and Receiver Positioning System', 70th EAGE Conference and Exhibition Incorporating SPE EUROPEC 2008, Jun. 9, 2008, only three sentence summary submitted, and considered.
Ross et al., 'Lessons Through Time in 4D Seismic', First Break, vol. 25, No. 12, Dec. 2007, only one sentence summary submitted, and considered.
"TUS Reservoir Monitoring Solutions", Thales Underwater Systems, Jan. 2003, (18 pages).
Shao et al., "Seabed seismic data logger," Journal of Geophysics, vol. 46, Issue 2, Mar. 31, 2003.
Berg et al., "Vector Fidelity in Ocean Bottom Seismic Systems", Offshore Technology Conference, Seabed Geophysical AG, 2002, (7 pages).
Broadband Sensors (Under Construction), https://web.archive.org/web/20030528230215/http:/www.mpl.ucsd.edu/obs/history.html, May 2, 2017 (5 pages).
Chen et al., "Seabed seismograph: instrument and its experimental technique," Geological Science Translation, vol. 12, Issue 1, Mar. 31, 1995.
Cieslewicz et al., "The Blackfoot III Buried Geophone Experiment", CREWES Research Report FFD014 vol. 10 (1998) (40 pages).
Clarke et al. "Correcting for Vector Infidelity With OBS Data: From Ugh to Aah!", Offshore Technology Conference (7 pages) 2002.
Drijkoningen, Guy G., "The Usefulness of Geophone Ground-Coupling Experiments to Seismic Data", Geophysics, vol. 65, No. 6 (Nov.-Dec. 2000); pp. 1780-1787 (8 pages).
Fjellanger et al., "Geophone Coupling and QC of Vector Fidelity", Norsk Hydro ASA, Research Center, University of Bergen, EAGE 64th Conference & Exhibition, May 27, 2002.
Gaiser, et al. "Vector Fidelity of OBC Data and Seafloor Coupling of the Vertical Component", Offshore Technology Conference (7 pages) 2002.
Gaiser, James E., "Compensating OBC Data for Variations in Geophone Coupling", Western Geophysical, Denver, CO, 1998 SEG Expanded Abstracts, (5 pages).

(56) References Cited

OTHER PUBLICATIONS

Granger et al., "Vertor Fidelity Assessment From 4C Seismic Data Recorded on the Seafloor" Offshore Technology Conference, May 6, 2002 (4 pages).
Hokstad et al., "Vector Fidelity of Ocean-Bottom Seismic Data", Offshore Technology Conference, May 6, 2002 (5 pages).
Klein et al., "OBH/OBS Versus OBC Registration for Measuring Dispersive Marine Scholte Waves", Geophysics, Kiel University, Jan. 18, 2000 (4 pages).
Krohn, Christine E. "Geophone Ground Coupling", Geophysics, vol. 49, No. 6, Jun. 1984, pp. 722-731 (10 pages).
Martin et al., Project PROBES (Puerto Rico Ocean Bottom Earthquake Survey), USGS, 2001, (15 pages).
Ocean Bottom Systems: miniDOBS Seismometer, Carrack Measurement Technology, May 1, 2017 (6 pages).
Office Action for CN 201510763534.4 dated May 26, 2017.
RSR Remote Seismic Recorder, Input/Output, Inc., 1999, (4 pages).
Spikes et al., "Varying the Effective Mass of Geophones", Geophysics, vol. 66, No. 6 (Nov.-Dec. 2001); pp. 1850-1855 (6 pages).
Stefanic, Vern, "4-C Projects Harvest Gulf Data", AAPG Explorer 4-C Seismic, Aug. 8, 2000 (6 pages).
Sutton et al. "Optimum Design of Ocean Bottom Seismometers", Marine Geophysical Researches (1987) 47-65, (19 pages).
Van der Veen et al., "Land Streamer for Shallow Seismic Data Acquisition: Evaluation of gimbal-mounted Geophones", Geophysics, vol. 63 No. 4, Jul.-Aug. 1998; pp. 1408-1413 (6 pages).
"4C Ocean Bottom Seismometer", 2006.
"Full Tilt" Geophon, SEND Off-Shore Electronics GmbH 2000-2011.
"Full Tilt Electronically Gimballed Geophone" SEND Signal Elektronik GmbH, Nov. 2005.
"LF-24 Low Frequency Geophone", Sensor Nederland b.v.
"Node Acquisition—Imaging the Blind Spots of Conventional Acquisition", CGGVeritas, Jan. 20, 2012.
"OBS for Seismic Ocean Bottom Surveys", SEND Off-Shore Electronics GmbH, 2000.
"SM-6 Geophone" Sensor Nederland bv, 1999.
Bernstein, Jonathan, "An Overview of MEMS Intertial Sensing Technology", Sensors, Feb. 2003.
Havskov, Jens, "Test of Seismic Recorders with 4.5 Hz Sensors: GBV316 from GeoSig and SL07 from SARA" Norwegian National Seismic Network Technical Report No. 26, Jun. 2007.
Mason, Richard, "Technology Shaking Up Land Seismic", The American Oil & Gas Reporter, Jul. 2007.
Notice of Allowance on U.S. Appl. No. 15/458,577 dated Aug. 23, 2017.
Notice of Allowance on U.S. Appl. No. 15/458,577 Jun. 29, 2017.
Office Action for CA 2,887,400 dated Jul. 10, 2017.
Office Action on U.S. Appl. No. 15/601,597 dated Aug. 25, 2017.
Office Action on U.S. Appl. No. 15/601,711 dated Sep. 11, 2017.
Send Signal Elektronik GmbH, Offer No. 060729, Aug. 1, 2006.
Tatham, Robert H., "Future Directions of Multicomponent Seismic Methods in the Marine Environment", Offshore Technology Conference, May 6-9, 2002.
US Office Action on U.S. Appl. No. 15/601,654 dated Sep. 11, 2017.
Woje et al. "Vector Fidelity Analyses of Seabed Seismic Data", Seabed Geophysical AS, EAGE 64th Conference & Exhibition, May 27-30, 2002.

* cited by examiner

OCEAN BOTTOM SEISMOMETER PACKAGE

CROSS-REFERENCE TO RELATED APPLICATIONS

The present application is a continuation of and claims benefit to U.S. patent application Ser. No. 13/565,445, filed Aug. 2, 2012, entitled "OCEAN BOTTOM SEISMOMETER PACKAGE", which will issue as U.S. Pat. No. 8,879,362 on Nov. 4, 2014, which is a continuation of and claims benefit to U.S. patent application Ser. No. 13/533,011, filed Jun. 26, 2012, entitled "OCEAN BOTTOM SEISMOMETER PACKAGE," which is a continuation of U.S. patent application Ser. No. 13/166,586, filed Jun. 22, 2011, now issued as U.S. Pat. No. 8,228,761, entitled "OCEAN BOTTOM SEISMOMETER PACKAGE," which is a continuation of U.S. patent application Ser. No. 12/838,859, filed Jul. 19, 2010, now issued as U.S. Pat. No. 7,990,803, entitled "DEPLOYMENT AND RETRIEVAL METHOD FOR SHALLOW WATER OCEAN BOTTOM SEISMOMETERS," which is a divisional of U.S. patent application Ser. No. 12/004,817, filed Dec. 21, 2007, now issued as U.S. Pat. No. 7,804,737, entitled "MARINE VESSEL WORKING DECK FOR HANDLING OF SHALLOW WATER OCEAN BOTTOM SEISMOMETERS," which is a continuation of U.S. patent application Ser. No. 11/592,584, filed Nov. 3, 2006, now issued as U.S. Pat. No. 7,724,607, entitled "METHOD AND APPARATUS FOR SEISMIC DATA ACQUISITION," which is a divisional of U.S. patent application Ser. No. 10/448,547, filed May 30, 2003, now issued as U.S. Pat. No. 7,310,287, entitled "METHOD AND APPARATUS FOR SEISMIC DATA ACQUISITION," each of which are hereby incorporated by reference in their entirety.

BACKGROUND OF THE INVENTION

The present invention relates to the field of seismic exploration. More particularly, the invention relates to a method and apparatus for seismic exploration, and most particularly to marine seismic exploration utilizing ocean bottom seismometer systems.

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic receivers are laid out in an array, wherein the array of seismic receivers consist of a single string of receivers distributed along a line in order to record data from the seismic cross-section below the line of receivers. For data over a larger area and for three-dimensional representations of a formation, multiple strings of receivers may be set out side-by-side, such that a grid of receivers is formed. Often, the receivers within an array are remotely located or spread apart. In land seismic surveys for example, hundreds to thousands of receivers, called geophones, may be deployed in a spatially diverse manner, such as atypical grid configuration where each string extends for 1600 meters with detectors spaced every 50 meters and the successive strings are spaced 500 meters apart. In marine surveys, a towed streamer having receivers, called hydrophones, attached thereto may trail up to 12,000 meters behind the tow vessel.

Generally, several receivers are connected in a parallel-series combination on a single twisted pair of wires to form a single receiver group or channel. During the data collection process, the output from each channel is digitized and recorded for subsequent analysis. In turn, the groups of receivers are usually connected to cables used to communicate with the receivers and transport the collected data to recorders located at a central location. More specifically, when such surveys are conducted on land, cable telemetry for data transmission is used for detector units required to be interconnected by cables. Other systems use wireless methods for data transmission so that the individual detector units are not connected to each other. Still other systems temporarily store the data until the data is extracted.

While the fundamental process for detection and recording of seismic reflections is the same on land and in marine environments, marine environments present unique problems due to the body of water overlaying the earth's surface, most notably the high pressure of deep water activities and the corrosive environment of salt water activities. In addition, even simple deployment and retrieval is complicated since operations must be conducted off the deck of a seismic exploration vessel, where external elements such as wave action, weather and limited space can greatly effect the operation.

In one common method of marine seismic exploration, seismic operations are conducted at the surface of the water body. Marine vessels tow streamers in which are embedded hydrophones for detecting energy reflected back up through the water column. The streamers are typically comprised of hydrophone strings, other electrical conductors, and material for providing near neutral buoyancy. The streamers are made to float near the water's surface. The same or other similar marine vessels tow acoustic energy sources, such as air guns, to discharge energy pulses which travel downwardly into subsurface geologic formations underlying the water.

Systems placed on the ocean bottom floor have also been in use for many years. These devices are typically referred to as "OBC" (Ocean Bottom Cabling) or "OBS" (Ocean Bottom Seismometer) systems. The prior art has centered on three main groups of ocean bottom apparatus to measure seismic signals at the seafloor. The first type of apparatus is an OBC system, similar to the towed streamer, which consists of a wire cable that contains geophones and/or hydrophones and which is laid on the ocean floor, where the detector units are interconnected with cable telemetry. Typically, a seismic vessel will deploy the cable off the bow or stern of the vessel and retrieve the cable at the opposite end of the vessel. OBC systems such as this can have drawbacks that arise from the physical configuration of the cable. For example, when three-dimensional geophones are employed, because the cable and geophones are not rigidly coupled to the sediment on the ocean floor, horizontal motion other than that due to the sediment, such as for example, ocean bottom currents, can cause erroneous signals. In this same vein, because of its elongated structure, OBC systems tend to have satisfactory coupling only along the major axis of the cable when attempting to record shear wave data. In addition, three ships are required to conduct such operations since, in addition to a seismic energy source vessel, a specially equipped vessel is necessary for cable deployment and a separate vessel is needed for recording. The recording vessel is usually stationary attached to the cable while the deployment vessel is generally in constant motion along the receiver line deploying and retrieving cable. Because the recording vessel is in constant physical contact with the cable, the effort required to maintain the vessel's position, wave action and ocean currents can generate great tension within the cable, increasing the likelihood of a broken cable or failed equipment, as well as the introduction of signal interference into the cable. Finally, such cable systems have a high capital investment and are generally costly to operate.

A second type of recording system is an OBS system in which a sensor package and electronics package is anchored to the sea floor. The device digitizes the signals and typically uses a wire cable to transmit data to a radio unit attached to the anchored cable and floating on the water surface. The floating transmitter unit then transmits the data to a surface vessel where the seismic data are recorded. Multiple units are typically deployed in a seismic survey.

A third type of seismic recording device is an OBS system known as Seafloor Seismic Recorders (SSR's). These devices contain the sensors and electronics in sealed packages, and record signals on the seafloor. Data are retrieved by retrieving the device from the seafloor. Such devices are typically re-usable. The focus of the present invention is on SSR type of OBS systems.

SSR type OBS systems generally include one or more geophone and/or hydrophone sensors, a power source, a seismic data recorder, a crystal oscillator clock, a control circuit, and, in instances when gimbaled geophones are used and shear data are recorded, a compass or gimbal. Except to the extent power is provided from an outside source via a cable, the power source is generally a battery package. To the extent prior art OBS systems have utilized on-board batteries, as opposed to external cabling, to supply power, the prior art batteries have been lead-acid, alkaline or non-rechargeable batteries. All of the OBS systems of the prior art generally require that the individual units be opened up for various maintenance, quality control and data extraction activities. For example, data extraction from prior art units require the units be physically opened or disassembled to extract data. Likewise, the unit must be opened up to replace spent batteries.

With respect to the timing function of the OBS system, synchronization between the timing of the sensor data and the firing of the seismic energy source or shot is critical in order to match a seismic source event with a reflection event. In the past, various crystal oscillator clocks have been used in OBS systems for this function. The clocks are relatively inexpensive and accurate. One drawback to such prior art clocks, however, is that the clock crystals are subject to gravitational and temperature effects. These gravitational and temperature effects can cause a frequency shift in the oscillator frequency, thereby resulting in errors in the seismic data. In addition, since the crystals are subject to gravitational effects, orientation of the OBS system can effect operation of the clock. Since the clock is typically secured within the OBS package so as to be correctly oriented when the OBS system is properly oriented on the ocean floor, any misorientation of the OBS system on the ocean floor can result in clock inaccuracies. Finally, such clocks often are characterized by drift and time shifts due to temperature changes and aging, which again, can cause inaccuracies in the recorded seismic data. While it may be possible that mathematical corrections could be made to the data to account for temperature aging and time shifts, there is no prior art device that corrects for gravitational effects on the crystal clock. At most, the prior art only corrects for effects of temperature on the crystal clocks.

More modem OBS systems may also include a mechanical device to correct for tilt, namely a gimbal. A gimbal is a device that permits free angular movement in one or more directions and is used to determine orientation of the OBS system on the ocean floor. Orientation data generated by the gimbal can then be used to adjust the seismic data recorded by the geophones. To the extent the prior art utilizes gimbals, they are most often incorporated as part of the geophone itself, which are referred to as "gimbaled geophones," One drawback to these mechanical gimbals of the prior art is the limited angular orientation permitted by the devices. For example, at least one of the prior art devices permit a gimbal roll of 360° but is limited in gimbal pitch to 30°. For this device, in order for such prior art gimbals to function properly, the OBS system itself must settle on the ocean floor in substantially the desired position. To the extent the OBS system is not oriented at least substantially in the horizontal, such as settling on its side or upside down, the mechanical gimbal of the prior art may not function properly. Other gimbaled devices of a mechanical nature are not limited by 30°, however, in such mechanically gimbaled devices, mechanical dampening in the device can deteriorate the fidelity of the recorded signal. Finally, gimballing of a geophone is expensive and requires more space than a non-gimballed geophone. For OBS systems that utilize multiple geophones, it may be impractical to gimbal the geophones due to size and space requirements.

As with orientation, the location of OBS system on the ocean floor is necessary to properly interpret seismic data recorded by the system. The accuracy of the processed data depends in part on the accuracy of the location information used to process the data. Since conventional location devices such as GPS will not operate in the water environments, traditional prior art methods for establishing the location of the OBS systems on the ocean floor include sonar. For example, with a sonar system, the OBS device may be "pinged" to determine its location. In any event, the accuracy of the processed data is directly dependent on the precision with which the location of the OBS system is determined. Thus, it is highly desirable to utilize methods and devices that will produce dependable location information. In this same vein, it is highly desirable to ensure that the planned positioning of the OBS device on the ocean floor is achieved.

With respect to operation of the aforementioned OBS systems, the prior art systems generally require some externally generated control command in order to initiate and acquire data for each shot. Thus the seismic receiver units must be either physically connected to the central control recording station or "connectable" by wireless techniques. As mentioned above, those skilled in the art will understand that certain environments can present extreme challenges for conventional methods of connecting and controlling the detectors, such as congested or deep marine areas, rugged mountain areas and jungles. Difficulties may also arise in instances where the receiver array is periodically moved to cover a larger area.

Whatever the case, each type of connection, whether via a physical cable or through wireless techniques, has its own drawbacks. In cable telemetry systems, large arrays or long streamers result in large quantities of electrically conductive cabling that are expensive and difficult to handle, deploy or otherwise manipulate. In instances where ocean bottom cabling is used, the corrosive environment and high pressures often require costly cable armoring in water depths over 500 feet. Furthermore, conventional cabling also requires a physical connection between the cable and the sensor unit. Since it is generally not practical to hard wire sensors on a cable, the more conventional technique is to attach cabling to sensors using external connections between the cable and the sensor. This point of the connection between the cable and the sensor is particularly vulnerable to damage, especially in corrosive, high pressure marine environments. Of course, with systems that are physically cabled together, it is much easier to provide power to the sensors, to synchronize sensors with the shot time and with each other and to otherwise control the sensors.

It should be noted that whether for cabled or wireless systems, where external cabling is required to connect the sensor package of the equipment with the recording and/or radio telemetry packages of the unit, many of the aforementioned drawbacks exist. Specifically, the OBS systems of the prior art are comprised of separate sensing and recording/ radio telemetry units or packages mounted on a carriage. The separate units have external connectors that are cabled together, presenting many of the same problems as cabling from the central control on the surface of the water. The primary reason for the separation between the sensing units, i.e., the geophone package, and the remainder of the electronics is the need to ensure that the geophones are effectively coupled to the ocean floor.

In cases where either wireless technology is utilized or operation of sensors is through pre-programming, control of the sensors becomes more difficult. For example, ensuring that recording is synchronized with the shot timing is crucial since the individual sensors are not wired together as described above. Hence the need for accurate on-board clocks as mentioned above. In this regard, activating each unit for sensing and recording at the appropriate time must coincide with the shot. Ensuring that the units are sufficiently powered has also heretofore been a concern. Many prior art patents have focused on techniques and mechanisms for powering up sensors during data acquisition and recording and powering down the sensors during dormant periods.

Various attempts have been made to address some of the above-mentioned drawbacks. For example, a seafloor seismic recorder is described in U.S. Pat. No. 5,189,642. This patent discloses an elongated, upright chassis formed of spaced apart, horizontal ring plates connected by vertical leg members. Each leg member is formed of nested tubes that can slide relative to one another and that are secured to one another by a clamp mechanism. Releasably attached to the lower plate is a ballast ring. Also attached to the lower plate is the geophone package. Attached to the upper plate is a foam buoy. A control package extends down from the upper plate. The control package houses a power source, a seismic data recorder, a compass and a control circuit. An external hard wire electrically connects the control package with the geophone package. The system does not utilize any hardwired communications link to the surface monitoring station but utilizes acoustical or preprogrammed means for controlling the unit. When released into the water, the ballast ring is suppose to provide sufficient mass to maintain the system upright and couple the geophones to the ocean floor upon settling. To minimize the likelihood of geophone noise produced by wave or water current motion acting against the buoy and control package, once the system is coupled to the ocean bottom, the clamp mechanism on each leg is released, allowing the control package and buoy to slide upward on the nested legs, isolating the geophones from the other parts of the system. Once seismic recording is complete, the ballast ring is then released from the chassis, and the system rises to the water surface under the positive buoyancy of the ballast. Acoustic transducers, a radio beacon and strobe light are provided to permit the system to be located and retrieved.

Another marine seismic data recording system is taught in U.S. Pat. No. 6,024,344. This patent teaches a method for deploying and positioning seismic data recorders in deep water. From a surface vessel, data recorders are attached to a semi-rigid wire which is deployed into the water. Due to the rigid nature of the wire, it functions to define a fixed interval between recorders as the recorders and wire sink to the seafloor. The wire also provides electrical communication fat power or signals between adjacent recorders and between recorders and the vessel. Once the recorders are in place, they are activated either by way of a preset clock or by utilizing a control signal transmitted through the water or through the wire. Upon completion of data gathering, the wire and recorders are retrieved. Deployment is accomplished utilizing a cable engine positioned on the surface vessel. As shown in FIG. 1 of the '344 patent, deployment occurs over the stern of the vessel as it moves in a direction away from the wire and recorders. This patent also teaches the need to store the recorders in a sequential manner to facilitate deployment and to track the seafloor location of the OBS system during data collection.

GeoPro offers a self-contained, i.e., cable-less, OBS system comprised of a 430 mm diameter glass sphere in which is enclosed all electrical components for the system, including batteries, a radio beacon, a seismic data recording unit, an acoustic release system, a deep sea hydrophone and three gimble mounted geophones. The sphere is mounted on a weighted skid that counteracts the buoyancy of the sphere and anchors the OBS system to the sea bed. The geophones are positioned in the bottom of the sphere adjacent the skid. To recover the OBS system upon completion of data collection, an acoustical command signal is transmitted to the sphere and detected by the deep sea hydrophone. The signal activates the acoustic release system which causes the sphere to separate from the weighted skid, which remains on the sea floor. Under positive buoyancy of the sphere, the free-floating system rises to the ocean surface, where the radio beacon transmits a signal for locating and retrieving the sphere. One drawback to this particular design is that the geophones are not coupled directly to the ocean floor. Rather, any seismic signal recorded by the geophones must pass through the skid and the bottom of the sphere, and in so doing, are subject to noise and other, distortions described above. It should be noted that this packaging design is representative of many of the cylinder and sphere shapes utilized in the prior art since it is well known that such shapes are more effective in withstanding the high pressures likely to be found in ocean environments.

K.U.M. and SEND offer a cable-less OBS system comprising a frame having a rod at the top and forming a tripod at the bottom. A foam flotation device is attached to the rod. An anchor is fixed to the lower portion of the tripod and secures the frame to the sea floor. Pressure cylinders mounted on the tripod portion of the frame contain seismic recorders, batteries and a release system. A hydrophone is attached to the frame in order to receive command signals from the ocean surface and activate the release system. Also attached to the frame is a pivotally mounted crane arm to which is releasably attached a geophone unit. During deployment, the crane arm is initially maintained in a vertical position with the geophone unit attached to the free end of the arm. When the frame contacts the sea floor, the crane arm pivots out from the frame and releases the geophone unit onto the sea floor approximately 1 meter from the frame system. A hard wire permits electrical communication between the geophone unit and the recorders. The geophone unit itself is an approximately 250 mm diameter, non-symmetrical disk which is flat on one side and domed on the opposite side. The flat side of the geophone unit is grooved and contacts the sea floor when released by the crane arm. Upon completion of data gathering, an acoustic signal activates the release system, which causes the anchor to be detached from the frame system. The foam flotation device causes the frame system and geophone to rise to the ocean surface where the system can be located using the radio beacon and retrieved.

SeaBed Geophysical markets a cable-less OBS system under the name CASE. This system is comprised of a control unit, i.e., electronics package, and a node unit or geophone package connected to each other by a cable. Both the control unit and the node unit are carried on an elongated frame. The control unit is comprised of a tubular body which contains batteries, a clock, a recording unit and a transponder/modem for hydro-acoustic communication with the surface. The node unit is comprised of geophones, a hydrophone, a tilt meter and a replaceable skirt, wherein the skirt forms a downwardly open cylinder under the geophone unit. The node unit is detachable from the elongated frame and control unit, but remains in communication with the control unit via external cabling. The use of a tubular body such as this is very representative of prior art designs because the system packaging must be designed to withstand the high pressures to which the device is exposed. During deployment, the entire unit is dropped to the sea floor, where a remotely operated vehicle (separate from the OBS system) is used to detach the node unit from the frame and plant the node unit into the seafloor, pushing the open-ended skirt into the seafloor sediment. The elongated frame includes a ring to which a deployment and retrieval cable can be attached. The communication transducer and modem are utilized control the system and transmit seismic data to the surface.

Each of the referenced prior art devices embodies one or more of the drawbacks of the prior art. For example, the OBS system of U.S. Pat. No. 5,189,642, as well as the devices of GeoPro and K.U.M./SEND are upright systems that each have a relatively tall, vertical profile. As such, seismic data collected by these systems is subject to noise arising from water movement acting against the devices. In addition, it has been observed that shear motion caused by movement of the ocean floor under such a tall profile OBS system can cause rocking motion of the OBS system, particularly as the motion translates from the bottom to the top of the unit, further deteriorating fidelity of the recorded data. Furthermore, these prior art devices are all asymmetrical, such that they can be positioned in only a single orientation. Typically this is achieved by heavily weighting one end of the OBS carriage. However, such a device likely must pass through hundreds of feet of water and contact an often rugged, uneven ocean floor that may be scattered with debris. All of these factors can result in mis-orientation of the system as it settles on the ocean floor, thereby effecting operation of the system. For example, to the extent such a prior art OBS system settles on its side, the geophones will not couple with the ocean floor at all, rendering the device unusable. In addition, incorrect orientation could interfere with the system's release mechanism, jeopardizing recovery of the system.

The tall profile of these prior art systems is also undesirable because such units lend themselves to becoming entangled in fishing lines, shrimping nets, various types of cables or other debris that might be present in the vicinity of the seismic recording activity.

On the other hand, prior art systems that have a smaller profile, such as ocean bottom cables, tend to have poor coupling ability or require external assistance in placement utilizing expensive equipment such as ROVs. For example, the elongated shape of ocean bottom cables results in "good" coupling in only a single orientation, namely along the major axis of the cable. Furthermore, even along the major axis, because of the small surface area of actual contact between the cable and the ocean floor, coupling can be compromised due to a rugged ocean bottom or other obstacles on or near the ocean floor.

Another drawback to these prior art systems is the need to activate and deactivate the units for recording and operation. This generally requires a control signal from the surface vessel, typically either transmitted acoustically or through a cable extending from the surface to the unit. External control of any type is undesirable since it requires signal transmission and additional components in the system. While acoustical transmission can be used for some data transmission, it is generally not reliable to use for synchronization purposes due to unknown travel path variations. Of course, any type of control signal cabling for transmission of electrical signals is undesirable because it adds a level of complexity to the handling and control of the unit and requires external connectors or couplings. Such cabling and connectors are particularly susceptible to leakage and failure in the high pressure, corrosive environment of deep ocean seismic exploration.

A similar problem exists with units that utilize external electrical wiring to interconnect distributed elements of the unit, such as is taught in U.S. Pat. No. 5,189,642 and similar devices where the geophone package is separate from the electronics package. Furthermore, to the extent the electronics of a system are distributed, the likelihood of malfunction of the system increases.

Many of the prior art systems also use radio telemetry rather than recording data on-board the unit, to collect the data. Such systems, of course, have limitations imposed by the characteristics of radio transmission, such as radio spectrum license restrictions, range limitations, line-of-sight obstructions, antenna limitations, data rate limitations, power restrictions, etc.

Those OBS units that utilize flotation devices for retrieval are undesirable because the typical decoupler device adds additional expense and complexity to the units, and generally must be activated in order to release the systems to the surface. In addition, such systems typically discard part of the unit, namely the weighted anchor or skid, leaving it as debris on the ocean floor. During deployment, since they are free-floating, such systems are difficult to position in a desired location on the ocean floor. Notwithstanding the above-mentioned possibility of malfunction due to misorientation, during retrieval, the free-floating systems are often difficult to locate and have been known to be lost-at-sea, despite the presence of radio signals and beacons. Likewise, in rough seas, the units prove unweildy to snare and lift on board, often colliding with the boom or vessel hull and potentially damaging the system.

In this same vein, handling of the units, both during deployment and retrieval, has proven difficult. To the extent a rigid or semi-rigid cable system is utilized to fix distances and position individual recorder units, such cables are inflexible, extremely heavy and difficult to manipulate. Such cables do not lend themselves to corrections during deployment. For example, as explained above, a desired grid layout identifies specific positions for individual units along a line. If a deployment vessel drifts or otherwise causes a cable being laid to be positioned off of the desired line, the vessel at the surface must reposition to cause the cable to get back on line. However, because of the rigid nature of the cable, the mispositioned portion of the cable will result in all of the remaining units on the cable to be mispositioned along the desired line.

Furthermore, current procedures utilized in the prior art to retrieve cables tends to place undue stress on the cables. Specifically, the widely accepted method for retrieval of a cable line from the ocean floor is to either back down over a line or drive the boat down the line retrieving the cable over the bow of the vessel. This is undesirable because the speed of the vessel and the speed of the cable winch must be carefully regulated so as not to overtension or pull the cable. Such regulation is often difficult because of the various external factors acting on the vessel, such as wind, wave action and water current. Failure to control tensioning or pulling of the cable will have the effect of dragging the entire length of the line, as well as the units attached thereto, subjecting the entire line and all of the units to damage. An additional drawback to this method is that if the vessel is moving too fast, it will cause slack in the cable and the cable will float under the vessel, where it can become entangled in the vessel's propellers.

Finally, nowhere in the prior art is there described a back-deck system for handling the above-described OBS units, whether it be storage of the units or deploying and retrieving the units. As the size of deep water seismic recorder arrays become larger, the need for a system for efficiently storing, tracking, servicing and handling the thousands of recorder units comprising such an array becomes more significant. Additional surface vessels are costly, as are the personnel necessary to man such vessels. The presence of additional personnel and vessels also increases the likelihood of accident or injury, especially in open-sea environments where weather can quickly deteriorate.

Thus, it would be desirable to provide a seismic data collection system that does not require external communication/power cabling, either from the surface or on the seismic data collection unit itself, nor any type of external control signal for operation. In other words, the unit should operate on a "drop and forget" basis. Likewise, the device should be easily serviced without the need to open the device to perform activities such as data extraction, quality control and power replenishment. The device should also be designed to withstand the corrosive, high pressure environment common in deep water marine applications. The unit should be configured to minimize the effects of noise arising from ocean currents, and maximize coupling between the device and the ocean floor. In this same vein, the device should be designed to properly orient itself for maximum coupling as the device contacts the ocean floor, without the assistance of external equipment such as ROVs, and minimize the likelihood of misorientation. Likewise, the device should be less susceptible to snaring or entrapment by shrimping nets, fishing lines and the like.

The device should include a timing mechanism that is not susceptible to orientation. Similarly, orientation should not effect gimballing of the geophones.

The device should be easily deployable, yet able to be placed at a certain location with a high degree of confidence. Likewise, the device should be easily retrievable without the need for flotation devices or release mechanisms, nor should parts of the unit be left in the ocean during retrieval. Further, there should be a device and retrieval procedures that minimize potentially damaging tension in the cable connecting the seismic units.

There should also be provided a system for readily handling the hundreds or thousands of recorder units that comprise an array for deployment in ocean environments. Such a system should be able to deploy, retrieve, track, maintain and store individual recorder units while minimizing manpower and the need for additional surface vessels. The system should likewise minimize potential damage to the individual units during such activity. Likewise, it would be desirable to include safety devices in the system to minimize harm to personnel handling the recorder units.

SUMMARY OF THE INVENTION

The present invention provides a system for collecting seismic data in marine environments by deploying multiple, continuous operating, wireless, self-contained ocean bottom sensor units or pods, each characterized by a symmetrical, low profile casing, and a unique external bumper to promote ocean bottom coupling and prevent entrapment in fishing nets. The pods are attached to one another utilizing a flexible, non-rigid, non-conducting cable that is used to control deployment of the pods through the water. The pods are deployed and retrieved from the uniquely configured deck of marine vessel, wherein the deck is provided with a conveyor system and a handling system to attach and detach individual pods from the non-rigid cable. In one embodiment, as part of the deck configuration, the individual pods are randomly stored in juke box fashion in slotted racks. When seated within the slot of a rack, the seismic data previously recorded by the pod can be retrieved and the pod can be charged, tested, re-synchronized, and operation can be re-initiated without the need to open the pod. In another embodiment, the individual pods are stored in stacked, rotating carousels that permit seismic data previously recorded by the pods to be retrieved and the pods to be charged, tested, re-synchronized, and operation can be re-initiated without the need to open the pod. During deployment and retrieval, the non-rigid cable and pods attached thereto are handled so as to minimize the likelihood of tension developing within the deployed line by virtue of movement of the surface vessel. This includes a uniquely configured non-rigid cable system designed to automatically shear apart if a certain level of tension is reached in the cable.

More specifically, each individual sensor unit is comprised of a disk-shaped, water tight case formed of two parallel, circular plates joined around their peripheries by a shallow wall, thereby forming a package which is symmetrical about the axis of the plates and has a very low height profile relative to the diameter of the plates, much in the shape of a wheel. The case is internally supported to protect the integrity of the case from external pressure effects and to provide rigid mechanical coupling between the unit case and the geophones. In one embodiment of the invention, the unit is configured so that it will effectively couple with the ocean floor and collect seismic data whichever plate side it settles on, obviating many of the orientation problems of the prior art. The plates may include ridges, projections or grooves to enhance coupling with the ocean floor.

Disposed around the shallow wall of the unit in one embodiment is a bumper having a cross section shape designed to urge the unit to settle onto one of the plate sides of the package, thereby resulting in a high degree of coupling between the unit and the ocean floor. In at least one embodiment, a bumper is provided and designed to prevent the unit from becoming entangled or snared in shrimping nets or fishing lines.

The unit utilizes several different devices for connecting to a cable. In one embodiment, each unit includes an over-center latching mechanism to permit the units to be attached to a cable. In another embodiment, an attachment bracket is located off-center on the side of the case. In still yet another embodiment, an attachment bracket is centrally located on one of the unit's circular plates forming the case.

The unit is self contained such that all of the electronics are disposed within the case, including a multi-directional geophone package, a seismic data recording device, a power source and a clock.

In one embodiment of the invention, the clock is a rubidium clock. The rubidium clock is much less susceptible to temperature or gravitational effects or orientation of the unit on the ocean floor.

In another embodiment, the unit includes a crystal clock and a tilt meter. Gravitational effects on the crystal clock are preferably corrected on-board the unit in real time utilizing tilt meter data.

The power source is preferably rechargeable batteries that can operate in a sealed environment, such as lithium ion batteries.

Units incorporating a tilt meter may also utilize the tilt meter data to perform various functions other than crystal clock correction. For example, one aspect of the invention utilizes tilt meter data for mathematical gimballing. Specifically, in the invention, gimballing of the geophones is accomplished mathematically using tilt meter data, and as such, is not subject to the orientation of the unit as are mechanical gimbals.

Of course, tilt meter data may also be used to determine the position of a unit on the ocean floor as is the common use of such data in the prior art. However, unlike the prior art devices, one aspect of the invention is to obtain and utilize tilt meter data in a time continuous fashion. Prior art units typically only determine a unit's position once at the beginning of seismic recording. Yet it has been observed that the position of a unit may change over the course of deployment as the unit is subject to external forces such as water currents, shrimp lines and the like. Thus, in the invention, tilt meter data is measured as a function of time. This is performed multiple times during operation so that seismic data can be corrected as necessary.

With respect to corrections for tilt, timing or similar data that could effect the accuracy of the collected seismic data, all of the prior art devices make such corrections at a processing center. None of the prior art devices make such corrections on-board the unit while it is deployed or even on board the deployment vessel. Thus, one method of the invention is to make such corrections on-board the unit while it is deployed.

The unit may also include a compass, a hydrophone, an acoustical location transducer and/or one or more accelerometers. Compass data may be used to provide frame of reference data for each individual unit relative to the frame of reference for the overall survey. In one embodiment of the invention, sensors such as accelerometers are used to track the position of the unit as it descends through a water column and settles on the ocean floor. Specifically, such sensors provide inertial navigation data and record x, y and z position information as the unit is passing through the water column. This position information, along with initial position and velocity information, is used to determine the eventual location of the unit.

In another aspect of the invention, the unit is activated while on-board the seismic vessel and deactivated once pulled from the ocean, such that it is continuously acquiring data from before the time of deployment to after the time of retrieval. Likewise in one embodiment, the unit begins recording data prior to deployment in the water. Systems that are activated and begin recording before deployment in the water are thereby stabilized prior to the time when signal detection is desired. This minimizes the likelihood that an altered state in electronics operation will disrupt signal detection and recording.

In another aspect of the invention, the seismic data recording device includes wrap around memory and continuously records, even when not in use. This obviates the need for initiation or start instructions, ensures that the unit is stabilized at the desired recording times, and serves to back-up data from prior recordings until such time as the prior data is written over. As long as the clock is synchronized, such a recording device is ready for deployment at any time. Furthermore, routine operations such as data collection, quality control tests and battery charging can take place without interrupting recording. In the case of a continuously recording unit such as this, the unit can be used on land or in a marine environment.

Use of a non-rigid cable is an additional aspect of the invention. While rope may have been used in the very early prior art as a tow line for surface floating seismic devices, heretofore, to the extent OBS systems have been connected to one another, the prior art has utilized only rigid or semi-rigid wire cable. One of the reasons wire cable has been desirable for the prior art OBS systems is the need to electrically interconnect the systems. In the current invention, however, flexible, non-rigid cable is utilized since the pods, as described above, operate independently and do not require external communications or connections. The non-rigid cable of the invention is preferably formed of a synthetic fiber material, such as polyester, and is encased in a protective overmold, such as a polyurethane casing. In one embodiment, the non-rigid cable is formed of a twelve stranded braided polyester core. The overmold is ribbed or grooved to reduce drag in the water.

The non-rigid cable of the invention is also useful in a unique deployment method for the pods. Specifically, the non-rigid cable has only a slightly negative buoyancy. When attached between two pods each having a negative buoyancy much greater than the cable, as the two jointed pods sink down through a water column, the drag on the non-rigid cable is much greater than the drag on the units and thus acts as a parachute or brake, slowing the descent of the pods and maintaining the pods in an upright position. This is particularly desirable in units that must be placed in a particular orientation, such as those units having non-symmetrical bumper configurations, because the cable, when attached to a centrally mounted connector on the top plate, functions to maintain the orientation of the unit as it passes down through the water column and settles on the ocean floor. Furthermore, since the cable of the invention is non-rigid, there is slack in the cable between adjacent pods. A vessel operator can utilize this slack to make corrections in the drop location while deploying the pods.

Likewise, the non-rigid cable enhances a unique retrieval method of the invention, wherein the cable is retrieved over the stern of the vessel as the vessel "drives down" the cable. In so doing, the drag on the cable created by the water causes the cable to parachute or billow out behind the vessel, minimizing excessive tension on the cable and ensuring that the cable is less likely to become entangled in the vessel's propellers.

On the deck of the seismic vessel, in one embodiment of the invention, a storage system includes a rack having multiple rows and columns of slots is disposed for receipt of the individual units. Each slot includes a communications portal such that when a unit is seated within the slot, the unit interfaces with a master control station via the communications portal. Through the portal, information recorded on the unit can be downloaded, the unit batteries can be recharged, quality control checks on the unit can be conducted, recording can be re-initiated and the unit can be reactivated. In another embodiment of the invention, a storage system includes stacked, u-shaped carousels. Each carousel includes rollers to permit the recording units to be moved along the path of the carousel in conveyor type fashion until the units are positioned adjacent a communications portal. Whichever storage system is utilized, the storage systems may be configured to have the dimensions of a standard 8'×20'×8' shipping container so that the storage systems and any seismic units stored therein, can be easily transported utilizing standard container ships.

Each unit may include a unique identification means, such as a radio frequency identification (RFID) tag or similar identification indicia to permit tracking of the individual units as they are handled on the deck. Likewise, as mentioned above, each unit may include an acoustical location transducer or accelerometers to determine a unit's location on the ocean floor. Since the individual units are self contained, the location information, in association with the identification indicia allows the units to be randomly inserted into the storage rack, but permits data from multiple units to be retrieved and sequentially ordered according to the previous location of the unit on the ocean floor. Thus, the need to keep units in sequential order is obviated. Units that might have been adjacent one another on a receiver line need not be stored next to one another in the racks.

In addition, the overall deployment and retrieval system for the units is substantially automated on the deck. The deck configuration includes a conveyor system running adjacent the racks and extending to the edge of the deck adjacent the water. A robotic arm is positioned for moving the units between the storage rack and the conveyor belt. In one embodiment, a cable engine and cable spool/container are positioned to pay out non-rigid cable so as to run adjacent the conveyor system and over the side of the vessel. As units are placed on the conveyor system for attachment to the non-rigid cable, the speed of the conveyor is adjusted to match the speed of the cable, permitting attachment of the units on-the-fly. Furthermore, those skilled in the art will understand that the payout speed of line is not constant since movement of the vessel through the water is not constant, even under calm seas and low wind conditions. As such, in order to prevent too much tension from developing in the line, which can result in damage to the line and dragging of the units, and to permit accurate placement of the units on the ocean floor, the speed of the line as it is paid out into the water is constantly adjusted to compensate for the erratic and unpredictable movement of the vessel on the water. Thus, the speed of the conveyor carrying the units for attachment to the line must be continually adjusted.

In another embodiment of the invention, the conveyor intersects with the cable being paid out by the cable engine. At the intersection, a seismic unit is attached to the cable and the attached unit is subsequently released into the water. A cable grabber downstream from the attachment station is used to securely clamp the cable prior to attachment of a unit, thereby removing upstream line tension during attachment of the unit to the cable. The cable grabber may include a release system requiring an operator to use both hands in order to open the grabber, thereby minimizing danger to the operator when the unit is released and the upstream cable is again placed under tension.

With respect to tension in the cable, the cable is sectioned and the cable sections are attached to one another utilizing a uniquely designed, break-away connector. The connector is comprised of first and second fittings that nest into each other. A shear pin is inserted through the nested fittings to secure the fitting together. Each fitting is attached to the end of a cable section such that when the fittings are secured together, the cable sections form a longer length of cable. If the tension in the cable become greater than the shear limit of the shear pin, the shear pin with break away and the cable will separate.

Furthermore, while one embodiment of the invention utilizes a clamping mechanism that permits units to be clamped directly on a length of cable, another embodiment of the invention utilizes a sleeve attached to the cable. The clamping mechanism secures to the sleeve which is bounded by overmolded shoulders. Rather than attaching shoulders between adjacent lengths of cable as is common in the prior art, the sleeve of the invention can be clamped or placed around a length of cable and secured in place without cutting the cable. In the embodiment, the sleeve is secured to the cable by inserting pins through the sleeve and cable in the x and y planes perpendicular to the axis of the cable. Shoulders are molded over the pins at the ends of each sleeve. While the overmolding on opposite ends of the sleeve can be used to define an attachment area along the sleeve, the sleeve may include flared ends that further define such attachment area.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
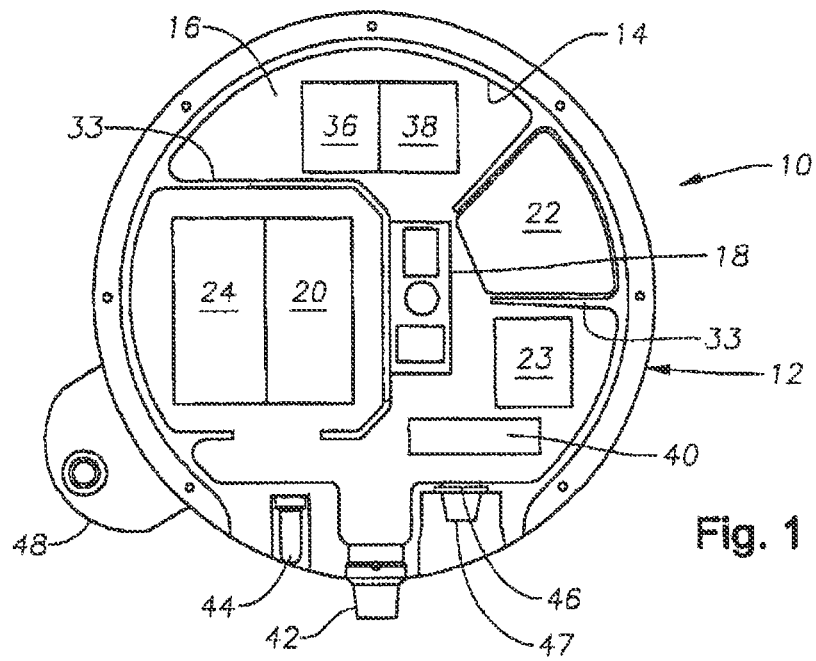
FIG. 1 is a cut-away top view of the seismic recorder unit of the current invention.

With reference to FIG. 1, there is shown a seismic data collection system or pod 10 of the invention. Pod 10 is comprised of a water tight case 12 having a wall 14 defining an internal, water-tight compartment 16. Disposed within compartment 16 is at least one geophone 18, a clock 20, a power source 22, a control mechanism 23 and a seismic data recorder 24. In the embodiment, pod 10 is self-contained such that power source 22 meets all of the power requirements of pod 10. Likewise, control mechanism 23 provides all control functions for pod 10 eliminating the need for external control communications. Pod 10 is weighted to have a negative buoyancy so that it will sink towards the ocean floor when deployed in a water column.

Those skilled in the art will appreciate that pod 10 is a self-contained seismic data collection system which requires no external communication or control in order to record seismic signals. It will be further noted that geophone 18 is internally mounted within pod 10 and thus requires no external wiring or connection. It has been determined that utilizing the case design described in more detail below, geophone 18 is effectively coupled to the ocean floor such that seismic data transmitted through pod 10 to geophone 18 is not corrupted by interference.

While the basic elements have been described above, pod 10 may also include a compass 36 and a tilt meter 38. Furthermore, in the preferred embodiment, geophone 18 is a geophone package comprised of three geophones to detect seismic waves in each of the x, y and a axes. Unless specifically indicated, all references to geophones utilized in the invention include conventional geophones as well as other known devices for detecting seismic wave activity, including without limitation, accelerometers.

In another embodiment of the invention, it has been found advantageous to utilize four geophones positioned in a tetrahedral configuration such that each geophone measures data in multiple planes. In a standard three dimensions configuration, three geophones are positioned 90° apart from each other and each geophone measures signal in a single x, y or z plane. In a four geophone configuration, the geophones are oriented perpendicular to the plane of the tetrahedral faces so that each geophone measures portions of multiple planes in the x, y, z coordinate system. For example, one geophone may measure seismic data in the x-plane and z-plane. Geophone configurations of four or more geophones are desirable because they provide for redundancy in the seismic unit in the event of failure of a geophone in a particular plane. None of the prior art OBS systems have utilized four or more geophones to detect seismic data in the manner.

In one important aspect of the invention, clock 20 is a rubidium clack. Heretofore, rubidium clocks have not been used in seismic exploration due in part to the expense when compared to traditional crystal driven clocks. However, because the pod 10 of the invention is intended to operate most effectively in one of several orientations, it is necessary to utilize a clock that in not susceptible to orientation effects which can inhibit operation of traditional prior art crystal clocks. Furthermore, rubidium clocks are less susceptible to temperature and gravitational effects that can inhibit operation of prior art clocks in ocean environments, Power source 22 is preferably a lithium ion battery. To the extent prior art OBS systems have utilized on-board batteries, as opposed to external cabling to supply power, the prior art batteries have been lead-acid, alkaline or non-rechargeable batteries. None of the prior art OBS systems have utilized lithium ion batteries. However, because of the sealed, self-contained nature of the pod of the invention, it is desirable to utilize a battery, such as the lithium ion type, that does not vent fumes and are easily rechargeable.

Figure 2:
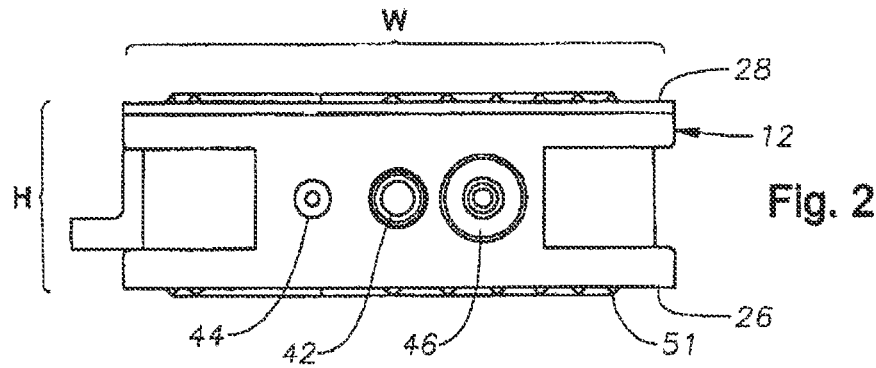
FIG. 2 is a front side view of the unit of FIG. 1.
Figure 3:
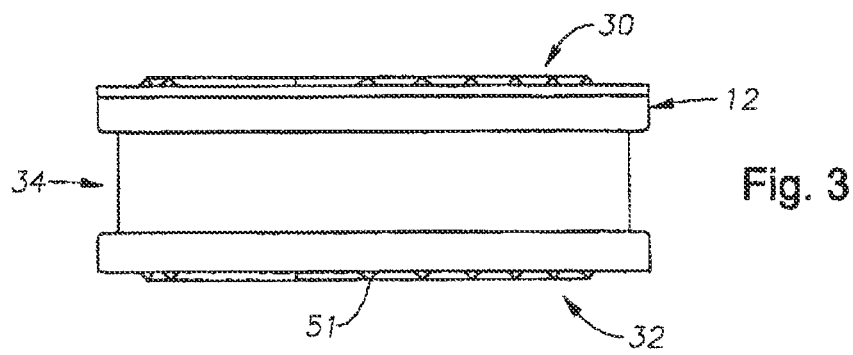
FIG. 3 is a back side view of the unit of FIG. 1.

In FIGS. 2 and 3, one of the unique features of pod 10 can be appreciated, namely the low profile configuration of pod 10. Specifically, case 12 comprises a first plate 26 and a second plate 28 jointed together along their peripheries by wall 14. In one embodiment plates 26 and 28 are disk shaped, such that the overall shape of case 12 is that of a wheel. In any event, as can be appreciated, each plate 26, 28 is characterized by a width (W) and wall 14 is characterized by a height (H), wherein the width W of plates 26, 28 is greater than the height of the wall. Of course, to the extent plates 26, 28 are disk shaped, then any references to width W should be replaced by a diameter D. However, for purposes of the low profile description, whether case 12 is circular in shape and characterized by a diameter D or otherwise characterized by a height H, the low profile characteristic is the same. While not limiting the overall low profile, in one embodiment, the height H is no more than 50% of the width W or diameter D. In one non-limiting example, the height H of pod 10 is approximately 6.5 inches and the width/diameter of pod 10 is approximately 18.5 inches.

As shown in the drawings, the pod 10 is substantially externally symmetrical about its x and y axes, such that, when deployed, pod 10 can settle on either side 30, 32 and still effectively couple to the ocean bottom. Thus, the orientation of pod 10 becomes much less of a concern as compared to prior art OBS systems designed to settle on the bottom in only one "upright" position. Furthermore, because of the narrow profile of pod 10, its balance is generally unstable on edge 34. Thus, to the extent pod 10 touches down on the ocean bottom on edge 34, the pod 10 will tip over and settle on one of the two faces 30, 32.

Pod 10 also includes internal ribbing 33 used to support plates 26, 28 as pod 10 is subjected to the high pressures characteristic of an ocean environment. Ribbing 33 prevents any "rattle" or movement of plates 26, 28 that could otherwise interfere with seismic wave detection. Unlike the prior art, pod 10 as described herein is effectively a casing for the geophones such that a seismic wave can pass undistorted through the pod's plate to geophone 18. In this regard, because of the low profile and rigid nature of pod 10, the attachment point of geophone 18 within case 12 becomes of less consequence and the problems associated with prior art designs are overcome.

Each unit may include a unique identification means, such as a radio frequency identification (RFID) tag 40 or similar identification indicia to permit tracking of the individual units as they are handled on the deck in the manner described below. Likewise, each unit may include an acoustical location transducer 42 which permits the unit's location on the ocean floor to be determined.

FIG. 1 also shows a hydrophone 44 to permit measurement of pressure and a connector 46 for permitting communication with pod 10 when pod 10 is on deck or otherwise disposed in a rack as described below. Connector 46 may be a standard pin connector or may be an infrared or similar connector that requires no hard wiring in order to communicate with pod 10. Via connector 46, pod 10 may be serviced without removing one of plates 26, 28 or otherwise opening case 12. Specifically, connector 46 permits quality control tests to be run, recorded seismic data to be extracted, clock 20 to be synchronized and power source 22 to be recharged. Because connector 46 is only utilized above the water, a water tight, pressure resistant connector cap 47 may also be provided to protect connector 46. Utilizing such a connector cap 47, connector 46 may be any standard connector that satisfies the desired functions of the pod. Connector 46 need not be of the type normally required of external connectors subjected to high pressure, corrosive environments.

Finally, shown in FIG. 1 is an optional attachment bracket 48 for clamping or otherwise grasping and manipulating pod 10. Bracket 48 is positioned on case 12 so that the radial angle between bracket 48 and any hardware that may be extending from pod 10, such as transducer 42 or hydrophone 44 is obtuse or acute. In the embodiment shown, the angle is acute. Specifically, it is common that upon deployment or retrieval of devices such as pod 10, such devices may bang against the side of the ship or other equipment as the pods are manipulated, potentially damaging hardware that protrudes from the devices. By positioning bracket 48 on the periphery of case 12 so that the radial axis extending from the center of case 12 through bracket 48 is less than 90° separated from the radial axis extending from the center of case 12 through transducer 42, the likelihood of damage to this hardware is diminished.

In one embodiment of the invention, rather than incorporating an attachment bracket 48, a latching mechanism is attached to wall 14, again, preferably, in an position to minimize damage to equipment protruding from pod 10. One effective latching mechanism is an over-center latching mechanism having opposing jaws that can be opened and closed to permit the units to be attached to a cable for deployment. The latching mechanism may further be attached askew to wall 14 so that the major axis of the latching mechanism and the z-axis of the pod 10 do not intersect. Again, such an orientation further protects hardware protruding from pod 10.

Figure 4:
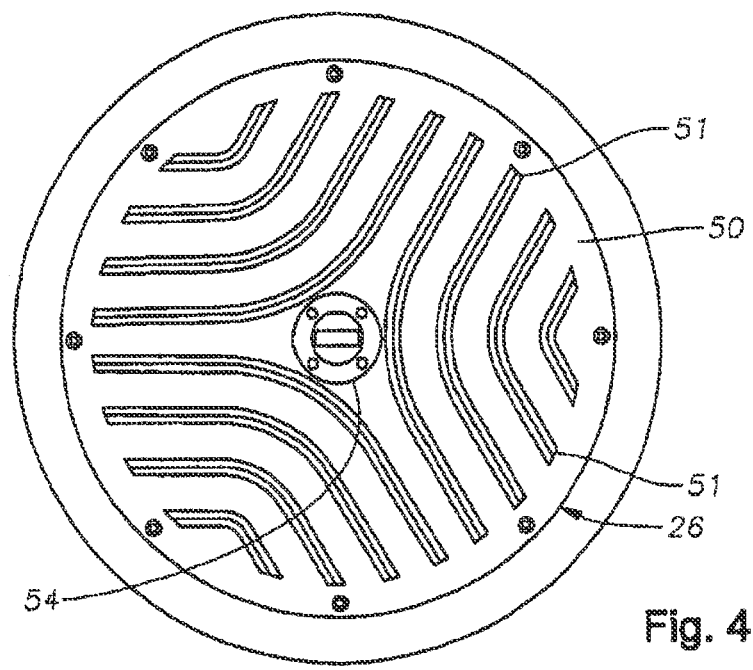
FIG. 4 is a top view of the unit of FIG. 1.

In FIG. 4, the external surface 50 of one or both of plates 26, 28 is illustrated. Specifically, surface 50 may be provided with projections 51, such as ridges or grooves, to enhance coupling between pod 10 and the ocean floor. In the embodiment shown, the projections 51 form a chevron pattern on surface 50.

Figure 5:
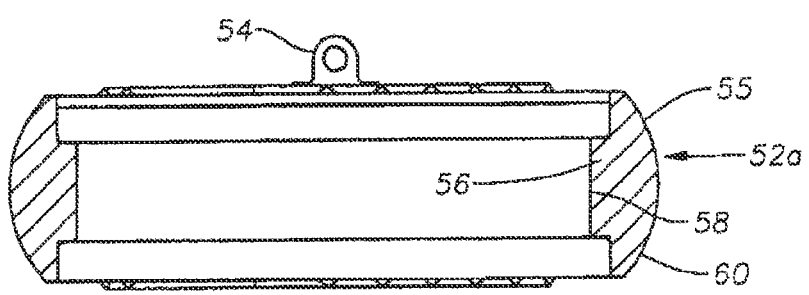
FIG. 5 is a back side view of the unit with a cross-section of the rounded bumper.

Also shown on FIGS. 4 and 5 is an attachment bracket 54 which may be incorporated for clamping or otherwise grasping and manipulating pod 10 so that plates 26, 28 remain substantially horizontal as pod 10 is lowered through a water column by a cable attached bracket 54. As such, bracket 54 may be axially centered on one of plates 26, 28 or otherwise positioned on one of plates 26, 28 above the center of gravity of pod 10.

Turning to FIGS. 4-8, one of the aspects of the invention is the incorporation of a bumper, generally numbered as bumper 52, around the pod 10. FIGS. 4-8 illustrate three different configurations of bumper 52, wherein the configurations are referred to as bumper 52a, bumper 52b and bumper 52c. In any event, bumper 52 has several functions. First, it may be shaped to urge pod 10 onto one of the two faces 30, 32 when pod 10 touches down on the ocean bottom on edge 34. Bumper 52 also functions to protect pod 10 and any external devices, such as transducer 42, which may be protruding from case 12. Finally, the bumper may be of a shape that inhibits pod 10 from becoming entangled by shrimping nets and shrimping drag or "tickle" chains. In any case, bumper 52 may serve some or all of these functions.

As stated above, bumper 52 may have several designs. In FIG. 5, bumper 52a is shown in cut-away disposed around case 12, while in FIG. 4, a bumper 52a is seen in a top view of pod 10. Specifically, bumper 52a is shown as having a rounded or curved cross section 55. As shown, bumper 52a includes a shoulder 56 which fits into a groove 58 defined around the periphery of case 12. A portion 60 of bumper 52a extends beyond the periphery of case 12, thereby protecting edge 34 of case 12. Due to the rounded nature of the bumper 52a, pod 10 will roll or tilt onto a coupling surface of plates 26, 28 if pod 10 begins to settle on the ocean floor so that plates 26, 28 are perpendicular with the ocean floor. Furthermore, bumper 52a will function to protect pod 10 from shock and to protect personnel during handling of pod 10.

Figure 6:
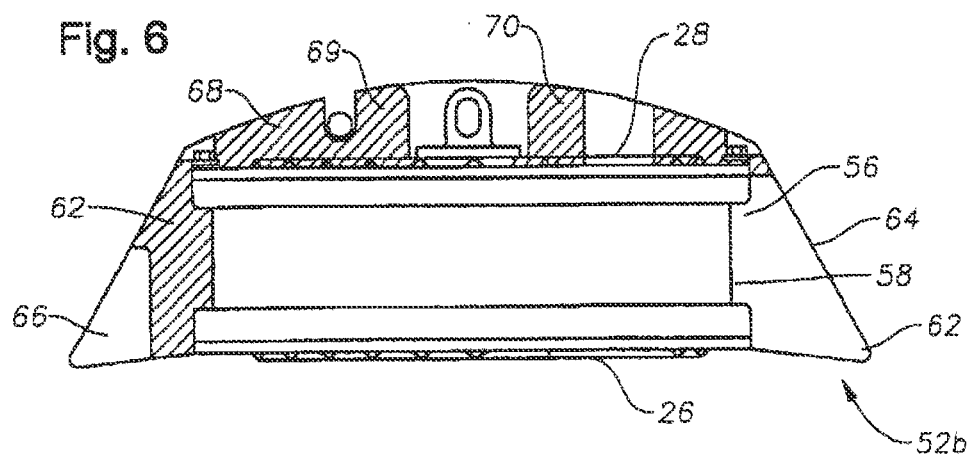
FIG. 6 is a back side view of the unit with a cross-section of a wedge bumper.
Figure 7:
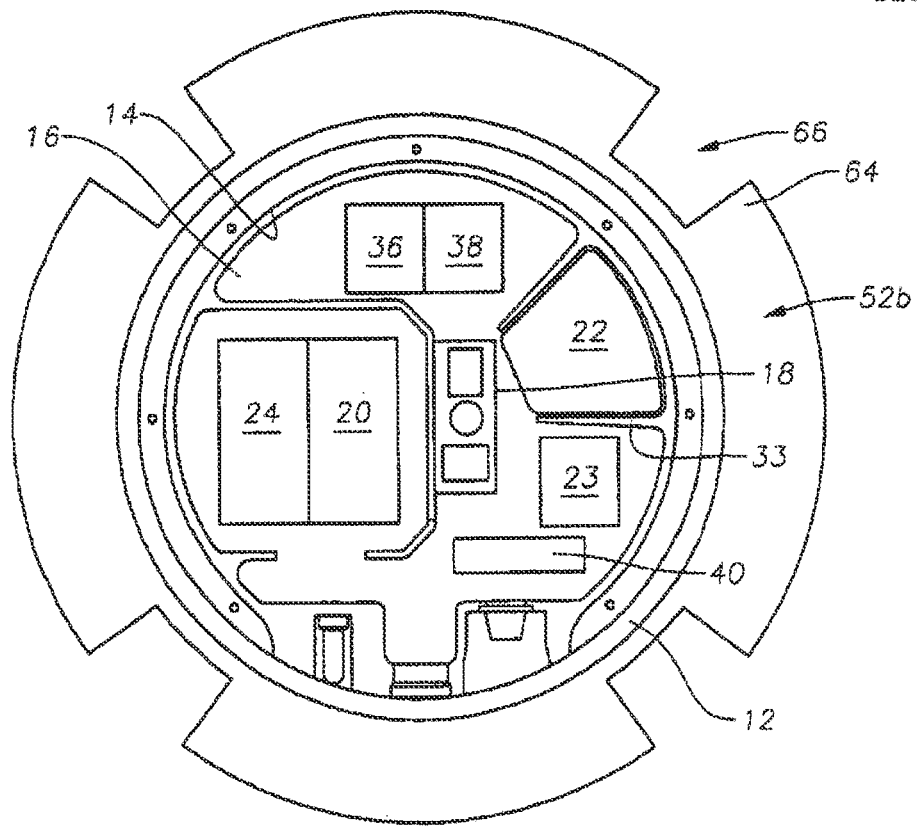
FIG. 7 is a top view of the unit with the wedge bumper of FIG. 6.

An alternate bumper profile is shown in FIGS. 6 and 7 in which bumper 52b has a wedge-shaped cross-section 62. Again, bumper 52b includes a shoulder 56 which fits into a groove 58 defined around the periphery of case 12. A portion 64 of bumper 52b extends beyond the periphery of case 12, thereby protecting plates 26, 28 and edge 34 of case 12. The bumper 52b illustrated in FIGS. 6 and 7 also includes cavities 66 which can be utilized as handholds for grasping and, manipulating pod 10. In the embodiment of 52b, it can be appreciated that it is desirable to orient pod 10 having bumper 52b on the ocean floor so that the wedge of bumper 52b faces down. Thus, for this embodiment, plate 28 is considered the top of pod 10 and plate 26 is considered the bottom of pod 10.

In the bumper 52b embodiment of FIGS. 6 and 7, an additional bumper portion 68 is shown mounted on top plate 28. Bumper portion 68 has a rounded cross-section 70 that transitions into wedge-shaped cross-section 62. In one embodiment, glass beads may, be molded or otherwise incorporated into bumper portion 68 to increase the buoyancy of bumper portion 68. By increasing the buoyancy at the top of pod 10, this insures that pod 10 will be properly oriented, i.e., so that wedge shaped bumper 52b faces down, as pod 10 passes through a water column and settles on the ocean floor.

To the extent a chain or other line is pulled against pod 10 when it is coupled to the ocean floor, the chain will simply slide along the wedge-shaped surface of bumper 52b and up over the top of pod 10. Bumper portion 68 further prevents such a chain or line from snagging or catching on any equipment which may be protruding from the upward-facing plate surface of pod 10.

Figure 8:
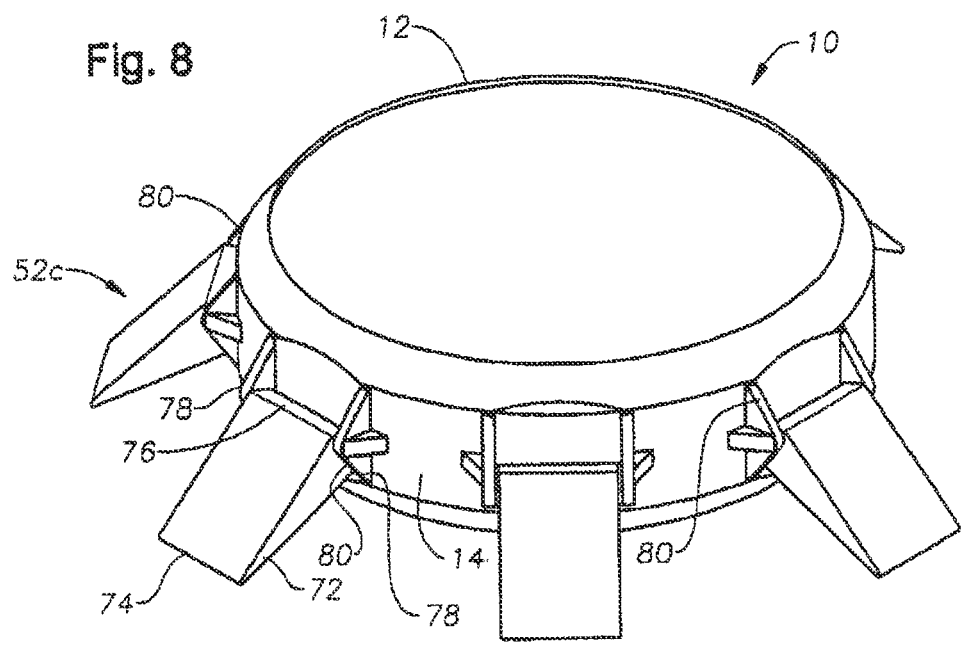
FIG. 8 is elevated view of the unit with a hinged flipper.

Still yet another embodiment of bumper 52 is illustrated in FIG. 8 in which bumper 52c is comprised of a flipper or wedge 72 having a narrow end 74 and a wide end 76. Wide end 76 is fitted and hinged between two brackets 78 attached to wall 14 of case 12. Preferably, brackets 78 are shaped so that their out edge 80 forms a substantially smooth transition surface with the surface of wedge 72. During deployment, pod 10 can settle on either surface 26, 28 and the hinged wedge 72 will flap down against the ocean floor, forming a ramp or skirt over which a shrimper chain or similar line will ride when pulled against pod 10. In this way bumper 52c will urge the chain over the top of pod 10 preventing the chain from snagging or catching pod 10.

Figure 9:
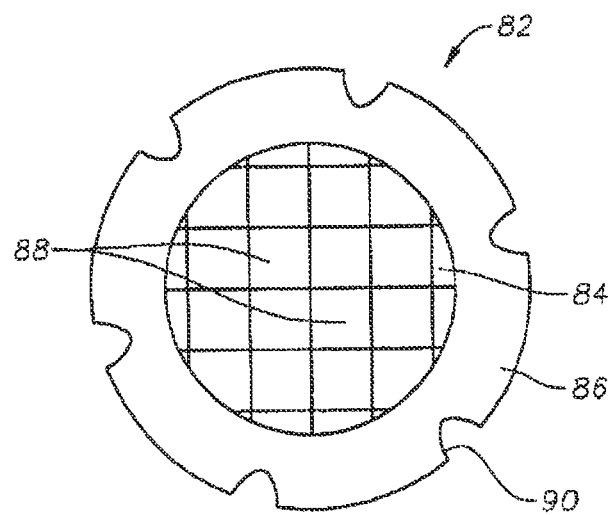
FIG. 9 is a cut-away end view of the non-rigid cable.

FIG. 9 illustrates the flexible, non-rigid cable 82 of the invention. Specifically, cable 82 is comprised of an inner core 84 and an outer casing 86. Inner core 84 is formed of non-rigid material. For purposes of the application, non-rigid material means stranded or fibrous, non-conducting material such as rope. It has been found that synthetic fiber material is preferable although other materials can serve the purpose of the invention. In one non-limiting example, the synthetic fiber is polyester. In one embodiment, core 84 is comprised of individual rope strands 88 formed of twisted rope fibers, wherein the rope strands 88 are braided together to form core 84. Outer casing 86 is molded over core 84. Casing 86 is further provided with ribs or grooves 90 to reduce drag in the water. In one embodiment, outer casing 86 is formed of polyurethane.

It will be appreciated that since pod 10 requires no external communications or power, cable 82 can be formed of a non-conductive material. Cable 82 as described herein is high strength with low stretch and no creep. Unlike rigid cable of the prior art, cable 82 does not exhibit torque, i.e., twisting, under load. Furthermore, cable 82 is light weight and easy to handle, especially compared to rigid and semi-rigid cable of the prior art. Thus, utilizing cable 82, pods 10 can be deployed along a receiver line by attaching pods 10 along cable 82 at spaced intervals.

Figure 10:
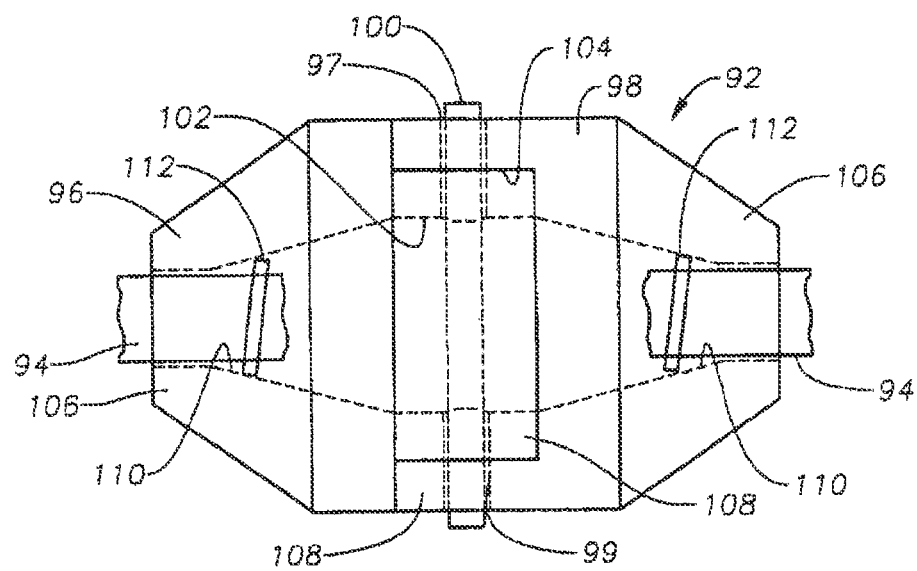
FIG. 10 is a cut-away side view of shear pin connector.
Figure 11:
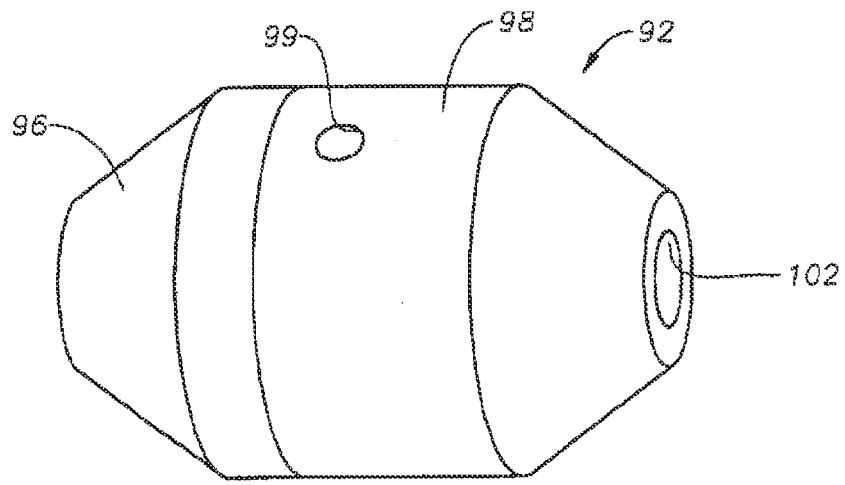
FIG. 11 is an elevation view of the shear pin connector of FIG. 10.

As illustrated in FIGS. 9 and 10, one aspect of the invention is to segment the cable and utilize a break-away connector 92 between cable segments 94. Connector 92 is comprised of a first fitting 96 that is seated inside a second fitting 98. A shear pin 100 is inserted through the fittings 96, 98 to secure the fittings together. The fittings are attached to the adjacent free ends of cable 94 using any standard means. In one embodiment, each of fittings 96, 98 has a bore 102, 104, respectively, extending from the first end 106 to the second end 108. At second end 108, each fitting has an aperture 97, 99 passing through opposing sides of each fitting. When fitting 96 is seated inside second fitting 98 such that apertures 97, 99 are aligned, shear pin 100 fits through the aligned apertures 97, 99, joining fittings 96, 98 at the respective second ends 108.

Defined within each bore 102, 104 at their respective first ends 106 is a shoulder 110. Each fitting is inserted over the free end of a cable 98 and a stop 112 is attached to the cable so that stop 112 abuts shoulder 110 and holds the fitting on the end of the cable. In another embodiment, the bore extending from second end 108 to first end 106 may taper and a stop larger than the diameter of the tapered bore can be utilized to secure the fitting on the free cable end.

In any event, each fitting 96, 98 is attached to the end of a cable section 94 such that when the fittings are secured together, the cable sections form a longer length of cable. If the tension in the longer length of cable becomes greater than the shear limit of the shear pin, the shear pin will break away and the longer length of cable will separate. Because the shear pin is easily inserted and removed, the shear limit for the joined cables can easily be adjusted for a particular environment or situation. For example, a shear pin with a shear limit of 5000 lbs may be desirable under certain conditions, whereas a shear pin with a shear limit of 8000 lbs may be desirable in other instances. To the extent the connector is separated under a shear, once the cable is retrieved, the fittings can easily be reattached by replacing the broken shear pin.

Such a break-away system is desirable because a cable tensioned beyond its operating limits can snap. For example, in prior art rigid and semi-rigid cables, tensions of 30,000 lbs or more can sometimes be generated. A cable snapping under such a load is likely to result in damage and injury. It is much more desirable to simply retrieve a length of separated cable than to incur such damage and injury.

In another aspect of such a system, the break-away tension of the pods attached to the cable is higher than the break-away tension of the connectors attaching cable segments. Thus in the event of a break away tension, the cable segments will separate before a pod is separated from the cable. This is desirable because it is much easier to locate and retrieve a length of cable, which can be snagged, than it is to locate and retrieve an individual pod which may have separated from the cable.

Figure 12:
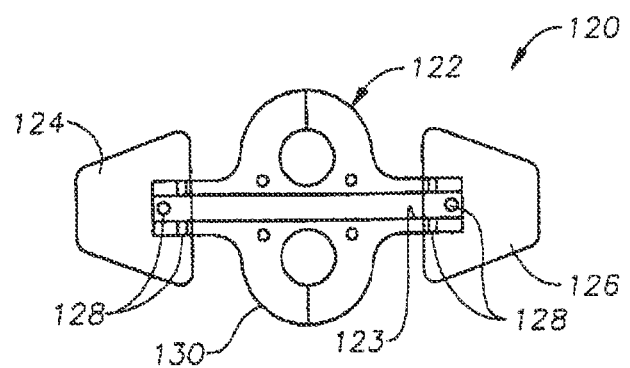
FIG. 12 is a cut-away side view of the pod attachment cable sleeve.
Figure 13:
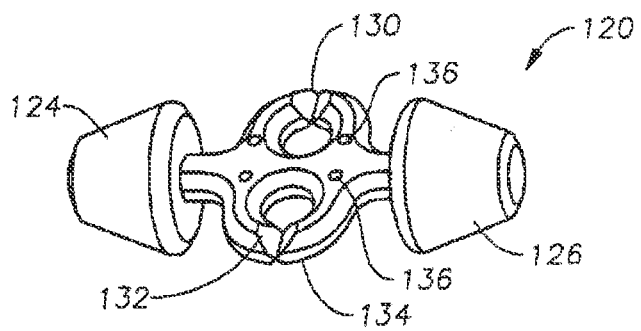
FIG. 13 is an elevation view of the attachment sleeve of FIG. 12.

FIGS. 12 and 13 illustrate a clamping mechanism 120 that permits seismic units to be clamped directly on a length of cable without the need to cut the cable as required in many prior art devices. Clamping mechanism 120 includes a sleeve 122 with an axial bore 123 therethrough that permits sleeve 122 to be fitted over a cable (not shown). Clamping mechanism 120 also includes overmolded shoulders 124, 126 disposed on opposite ends of sleeve 122. An aperture 128 passes through each end of sleeve 122, preferably in both the x and y planes perpendicular to the axis of sleeve 122. In the illustrated embodiment, sleeve 122 includes a ring portion 130 to which a seismic unit may be attached. In another embodiment, sleeve 122 may be tubular without a ring portion 130. Sleeve 122 may be integrally formed or may be halves clamped together such as is shown in FIG. 13, where a sleeve first half 132 and a sleeve second half 134 are clamped around a cable (not shown) and secured to one another with fasteners 136.

When installed on a cable, a pin is passed through apertures 128 to secure clamping mechanism 120 from sliding on the cable. Shoulders 124, 126 are molded over the ends of sleeve 122 and help secure the attachment pins in place. The ends of sleeve 122 may also be flared to help secure shoulders 124, 126 in place.

Thus, rather than cutting a cable and attaching a clamping mechanism between free cable ends, the sleeve of the invention can be clamped or slid onto a length of cable and secured in place without cutting the cable. Using pins to secure the mechanism in both the x and y planes prevents rotation of clamping mechanism 120 relative to the cable and prevent slippage axially along the cable.

Figure 14:
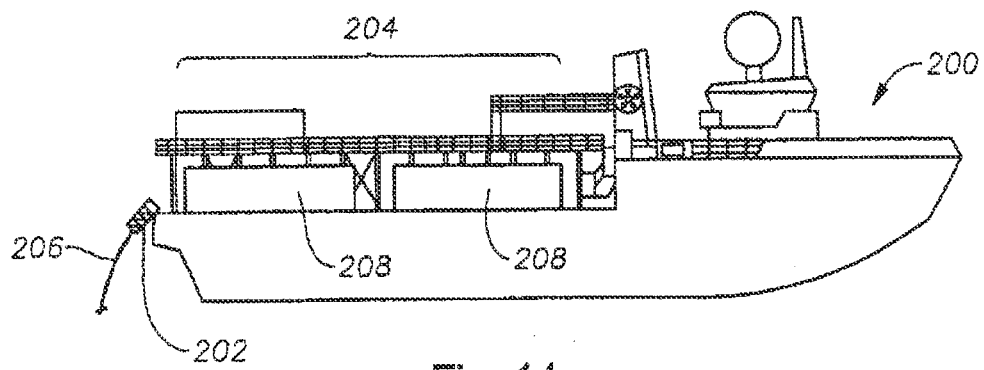
FIG. 14 is a side view of a seismic system deployment and retrieval vessel.

The back deck of a seismic system deployment and retrieval vessel is illustrated in FIGS. 14-19. Generally shown in FIG. 14 is a seismic system deployment and retrieval vessel 200 having a work deck 202 with a seismic deployment and retrieval system 204 disposed thereon for deploying and retrieving cable 206.

Figure 15:
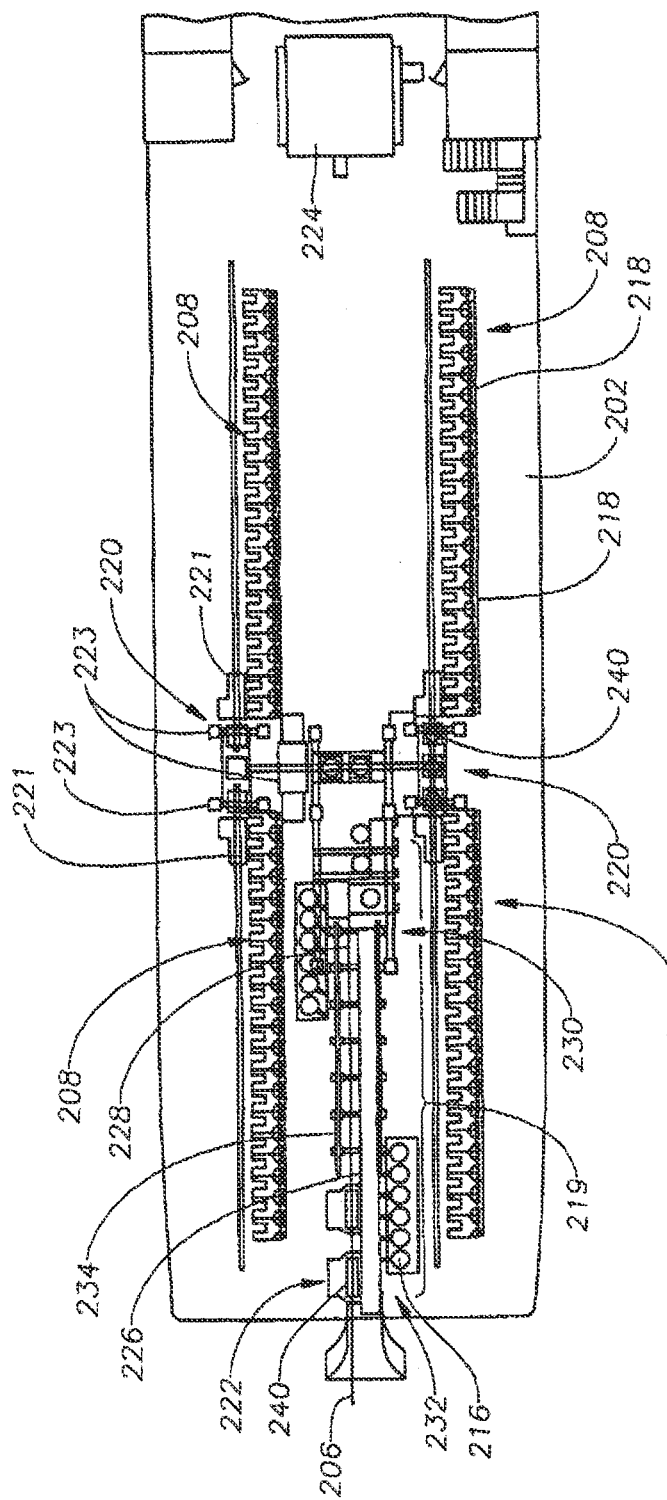
FIG. 15 is a back deck layout illustrating an automated, speed-matching, pod launcher system and pod storage system.
Figure 16:
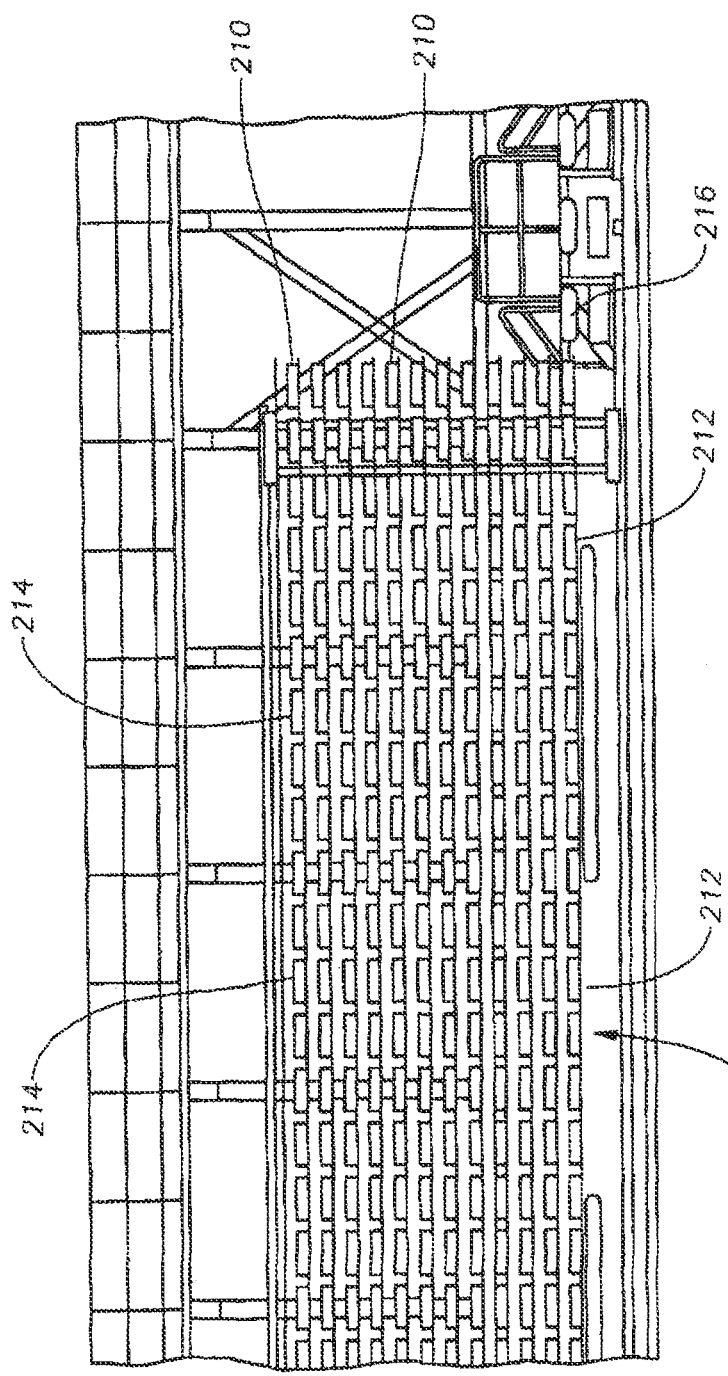
FIG. 16 is a side view of the juke box storage rack.
Figure 17:
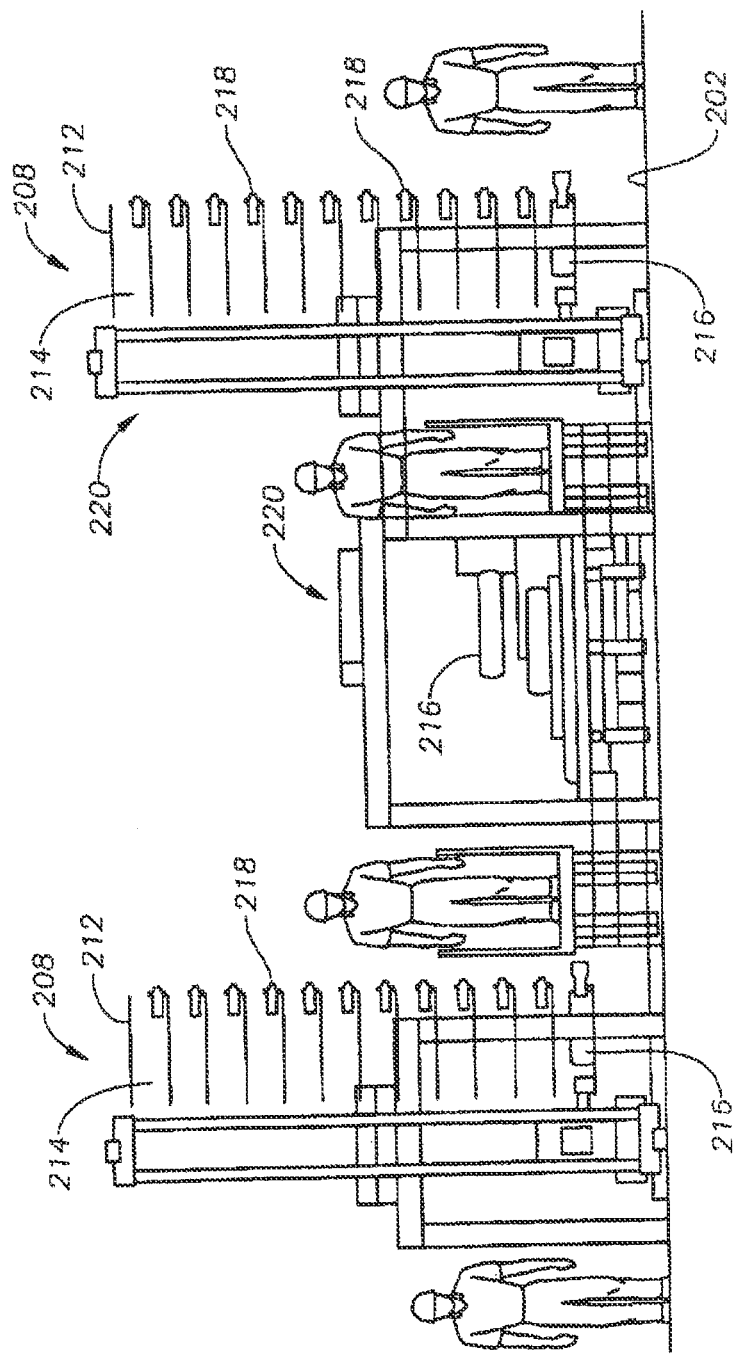
FIG. 17 is an end view of the deck layout of FIG. 15.

One component of the deployment and retrieval system 204 is a storage rack 208 for storing the OBS units attached to cable 206. As will be appreciated, storage rack 208 is scalable to meet the particular pod storage needs and space limitations of a vessel. In FIGS. 14 and 15, four storage racks 208 have been provided to maximize the pod storage capacity of the particular vessel 200. As best seen in FIG. 16, each storage rack 208 is comprised of multiple rows 210 and columns 212 of slots 214, wherein each slot 214 is disposed for receipt of a pod 216. While the dimensions for slot 214 may vary depending on the dimensions of the particular OBS unit stored therein, the preferred embodiment illustrates storage rack 208 disposed for receipt of low profile, disk shaped pods as described above and generally referred to as pod 10. Referring to FIG. 17, each slot 214 is provided with a communications portal 218 to permit communication between a pod 216 and a master control station (not shown) when pod 216 is seated in slot 214. In one embodiment, communications portal 218 is linked with pod 216 via the connector 46 shown in pod 10 (see FIG. 1). As described above, the link may be a hard wire between communications portal 218 and connector 46 or may be some other method of communication, such as an infrared connector. Whatever the case, through portal 218, information recorded on the pod 216 can be downloaded, the unit batteries can be recharged, quality control checks on the unit can be conducted, the clock can be synchronized, recording can be re-initiated and the unit can be reactivated, all while seated in slot 214.

In another embodiment of storage rack 208, the rows and columns of slots are replaced by a single stacked column of carousels, preferably semicircular or u-shaped. Each carousel includes rollers to permit the recording units to be moved along the path of the carousel in conveyor type fashion until the units are positioned adjacent a communications portal. The shape of the carousel path is preferably semicircular or u-shaped to permit recording units to be inserted at a first end of the carousel and removed from a second end. Such a configuration would permit pods to be inserted and removed simultaneously from the carousel. As an example, the first end of the carousel may be located next to a cleaning station for cleaning pods retrieved from the ocean floor and the second end of the carousel may be located next to a deployment station to permit pods to be reattached to the cable for deployment.

Whichever storage system is utilized, the storage systems may be configured to have the dimensions of a standard 8×20'×8' shipping container so that the storage systems and any seismic units stored therein, can be easily transported utilizing standard container ships.

Figure 18:
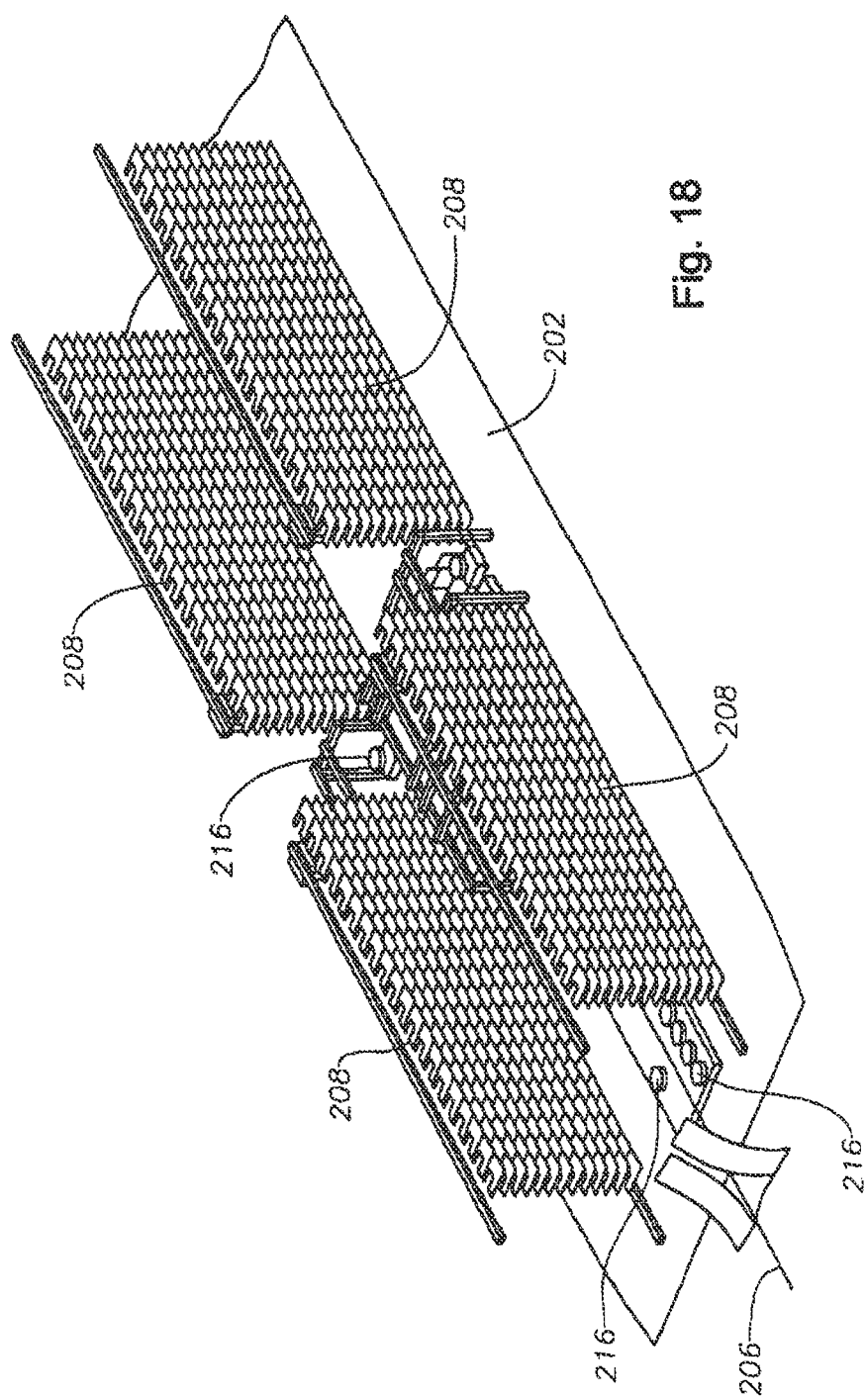
FIG. 18 is an elevation view of the deck layout of FIG. 15.

As best seen in FIGS. 15, 17 and 18, one embodiment of system 204 is shown in which the back deck system is substantially automated.

In addition to the storage rack 208, there is shown a pod deployment system 219 running adjacent the racks 208 and extending to the edge of the deck 202 adjacent the water. A pick and place system 220 is positioned for moving the units 216 between the storage rack 208 and the deployment system 219. While various automated and semi-automated pick and place systems 220 may be utilized, in the embodiment shown, one or more single axis shuttles 221 are used to move pods 216 between one or more grappling arms 223 that can move pods 216 between racks 208, shuttles 221 and the deployment system 219.

More specifically, deployment system 219 is comprised of a conveyor roller bed 226 running parallel to non-rigid cable 206 and a pod deployment carriage 228 moving in conjunction with conveyor 226. A cable engine 222 and cable spool/container 224 are positioned to linearly move non-rigid cable 206 adjacent the deployment system 219 and over the side of the vessel. Pods 216 are attached to non-rigid cable 206 while cable 206 continues to be paid out into the water, i.e., on-the-fly, by utilizing carriage 228 to accelerate pod 216 to the speed of cable 206. At the point when the velocity of cable 206 and pod 216 are substantially equivalent, pod 216 is attached to cable 206, at which point pod 216 is released from carriage 228 and continues to move along conveyor 226 propelled by the cable to which it is attached.

Conveyor 226 has a first end 230 and a second end 232, wherein the pick and place system 220 is positioned adjacent the first end 230 and one or more cable engines 222 are positioned adjacent the second end 232, such that pod 216 generally travel along conveyor 226 from the first end 230 to the second end 232. Pod deployment carriage 228 likewise runs on a track or frame 234 at least partially along a portion of the length of conveyor 226. When a pod 216 is ready for deployment, it is pulled from rack 208 utilizing arm 223 and moved on shuttle 221 to a position adjacent the first end 230 of conveyor 226. A grappling arm 223 places pod 216 on carriage 228 which is likewise positioned on its track 234 to be adjacent first end 230 of conveyor 226. Once pod 216 is in place on carriage 228, carriage 228 is accelerated down conveyor 226 towards the second end 232 of conveyor 226. As the acceleration of the carriage 228 reaches the velocity of cable 206, pod 216 is clamped or otherwise secured to cable 206. In one embodiment, pod 216 includes a clamp with jaws that can be closed around cable 206 once attachment speed is attained. In such an embodiment, pod 216 can be clamped directly onto cable 206 or can be clamped to an attachment sleeve disposed on cable 206. In either case, cable engine 222 will continue to pull cable 206, causing pod 216 to move down conveyor 226 until it is deployed over the edge of boat 200.

One or more RFID readers 240 may be placed along pick and place system 220 and deployment system 219 to track movement of particular pods 216 along deck 202. Such tracking is particularly desirable with respect to the deployment and retrieval system 204 described above because the self-contained nature of the pods eliminates the need to keep units in a particular order as they are manipulated on deck 202 and inserted into racks 208. In other words, since the individual pods 10 of the invention are self contained and each pod's ocean floor location and orientation information is recorded within the pod along with the seismic data recorded at the location, the units need not be kept in sequential or receiver line order as they are retrieved from the ocean, manipulated and stored. In this regard, units that might have been adjacent one another on the shot line need not be moved in a particular order through system 204 and need not be stored next to one another in racks 208, but may be randomly inserted into the storage rack 208.

As can be appreciated by those skilled in the art, the speed of the cable 206 as it is paid out into the water is constantly adjusted to compensate for the erratic and unpredictable movement of vessel 220 in the water. In the preferred embodiment, the speed of the carriage 228 carrying the units 216 for attachment to the cable 206 can continually be adjusted to permit pod 216 to be smoothly attached to cable 206 on the fly.

While conveyor 226, carriage 228 and cable 206 are all described in a linear arrangement, it is understood that non-linear arrangements are also encompassed by the invention, so long as such arrangements accelerate a marine seismic unit so as to permit attachment of the unit to a moving cable.

As described above, deployment system 219 can be utilized to practice one method of the invention, namely attachment and release of seismic units 216 on the fly without stopping the movement of cable 206 as it is paid out into the water. The method which can be used in conjunction with deployment system 219 includes the steps of providing a cable moving at a given speed and along a cable path, accelerating a seismic unit along a path adjacent to the cable path until the seismic unit is moving at approximately the speed of the cable and attaching the seismic unit to the cable while both are in motion. In this way, a seismic unit can be attached to a cable and released into the water without the need to stop and start the cable and/or the vessel during deployment, thereby reducing the time necessary to lay out a length of cable along a receiver line.

Figure 19:
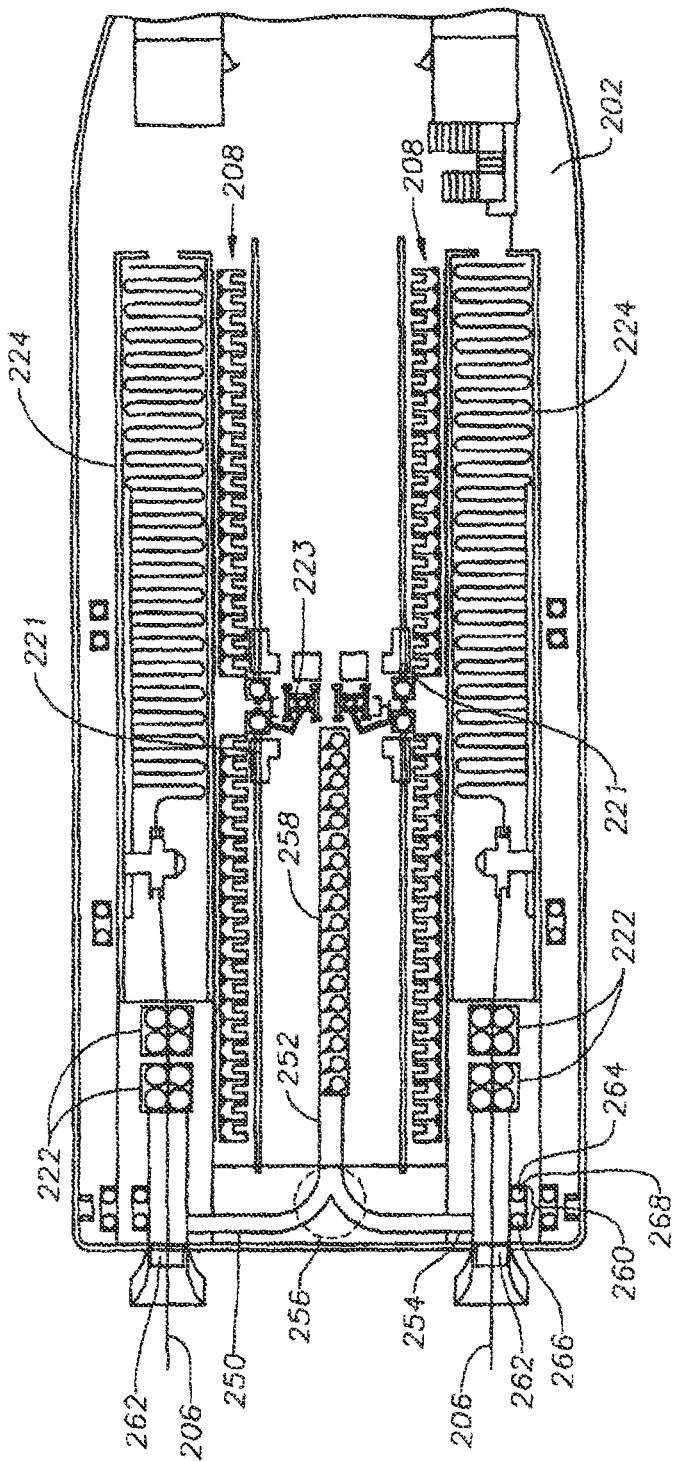
FIG. 19 is a back deck layout illustrating the semi-automatic pod attachment system.

In another embodiment of the invention shown in FIG. 19, a semi-automatic conveyor 250 intersects with the cable 206 as it is being pulled from cable spool/container 224 and paid out by the cable engine 222. In this case, storage racks 208 and pick and place system 220 are arranged on either side of conveyor 250, in a configuration similar to that shown in FIG. 15. However, rather than having cable 206 run adjacent conveyor 250, cable 206 is spaced apart from conveyor 250. In this embodiment, conveyor 250 is defined by a first end 252 and a second end 254. A portion 256 of conveyor 250 is curved to permit pods 216 to be moved out to cable 206 for attachment of pods 216 to cable 206 at the second end 254 of conveyor 250. Also shown is a second conveyor 258 used to stage pods 216 prior to attachment to cable 206. Second conveyor 258 moves pods 216 from a position adjacent the pick and place 220 to the first end 254 of conveyor 250.

An attachment station 260 is defined at the intersection of cable 206 and conveyor 250. At attachment station 260, a marine seismic unit 216 is attached to the cable 206 and the attached unit is subsequently released into the water. In one embodiment, a cable grabber 262 is positioned downstream from the attachment station 260. During deployment of pods 216, cable grabber 262 is used to securely clamp cable 206 prior to attachment of a unit 216 at attachment station 260, thereby removing line tension upstream of grabber 260 to permit a unit 216 to be safely attached to cable 206. This is especially desirable in semi-automated configurations in which personnel manually attach units 216 to cable 206. In any event, a cable grabber release system 264 may be included at attachment station 260 to minimize the likelihood that personnel are adjacent or in contact with cable 206 at the time cable grabber 262 is released and cable 206 is placed under tension. In the preferred embodiment, release system 264 includes a first button 266 and a second button 268 that must be simultaneously actuated in order to cause a release by cable grabber 262. Thus, desirably, a single operator must use both hands in order actuate release system 264 and as such, release system 263 functions as a safety device to minimize danger to the operator.

While not necessary, in the embodiment of the invention illustrated in FIG. 19, the back deck is outfitted with two cable deployment systems wherein one system is located on the port side of deck 202 and the other system is located on the starboard side of deck 202 with storage racks 208, pick and place system 220 and conveyor 250 positioned therebetween. Conveyor 250 curves out to both sides and each cable deployment system includes a cable spool/container 224, a cable engine 222, an attachment station 260 and a cable grabber 262. Dual systems such as this permit redundancy and ensure that the seismic operation will not be delayed in the event of malfunction of one of the systems.

One function of the seismic data recording unit of the invention is the continuous operation of the unit. In this aspect of the invention, data acquisition is initiated prior to positioning of the unit on the earth's surface. In one preferred embodiment, a marine seismic unit is activated and begins acquiring data prior to deployment in the water. Systems that are activated and begin acquiring data prior to deployment are thereby stabilized prior to the time when signal detection is desired. This minimizes the likelihood that an altered state in electronics operation will disrupt signal detection. Of course, in the case of a continuous data acquisition unit such as this, the novelty lies in the "continuous" nature of the unit and such function is applicable whether on land or in a marine environment.

In a similar embodiment, data recording is initiated prior to positioning along a receiver line. For example, a marine seismic data recording unit is activated while still on the deployment vessel and begins acquiring data prior to deployment in the water. Again, this permits units to stabilize prior to the time signal recording is desired. To this end, one component of system stabilization is clock stabilization. Of the various components of the system, it is well known that clocks typically take a long time to stabilize. Thus, in one embodiment of the invention, whether the unit is continuously detecting data or continuously recording data, the clock always remains on.

In either of the preceding two methods, the unit can be utilized in several cycles of deployment and retrieval without interrupting the continuous operation of the unit. Thus, for example, prior to deployment, recording is initiated. The device is deployed, retrieved and redeployed, all while recording is continued. As long as memory is sufficient, this continuous recording during multiple cycles of deployment and redeployment can be maintained.

In this regard, to the extent the seismic data unit includes wrap around memory, it can continuously record even when not in use in seismic detection. Thus, in addition to the advantages described above, initiation or start instructions become unnecessary. Further, continuous recording utilizing wrap around memory functions as a back-up for data acquired from prior recordings until such time as the prior data is written over. An additional advantage is that the device is ready for deployment at any time as tong as the clock is synchronized.

To the extent recording is continued after a unit has been retrieved, routine operations such as data collection, quality control tests and battery charging can take place without interrupting recording. One benefit of such a system is that the device can be utilized to record quality control test data rather than seismic data when conducting quality control tests. In other words, the data input changes from seismic data to quality control data. Once quality control is complete, the device may resume recording seismic data or other desired data, such as data related to position and timing.

In one preferred embodiment of the invention, a marine seismic unit includes an inertial navigation system to measure the unit's x, y and z position information as the unit is passing through the water column and settles on the ocean floor. Generally, such a system measures movement in each of the x, y and z dimensions as well as angular movement around each x, y and z axis. In other words, the system measures the six degrees of freedom of the unit as it travels from the vessel to the ocean floor, and utilizes such measurement information to determine location on the ocean floor. In the preferred embodiment, such x, y and z dimensional information can be determined utilizing accelerometers. Angular orientation, i.e., tilt and direction, information can be determined utilizing a tilt meter and a compass or other orientation devices, such as gyroscopes. In one embodiment of the invention, three accelerometers and three gyroscopes are utilized to generate the inertial navigation data used to determine the unit's ocean floor position.

In any event, by combining accelerometer and the tilt and direction information as a function of time with the unit's initial position and velocity at the time it is discharged into the water column, the travel path of the unit through the water column can be determined. More importantly, the location of the unit at the bottom of the water column, i.e., the location of the unit on the ocean floor, can be determined.

Time sampling will occur at appropriate intervals to yield the accuracy needed. Time sampling between various measurement components may vary. For example, data from the compass, used to measure direction, and the tilt meter, used to measure tilt, may be, sampled more slowly than data from the accelerometers. Heretofore, no other marine seismic unit has utilized one or more accelerometers to determine location in this way. In this regard, the method and system replaces the need to determine ocean floor location utilizing other techniques, such as through acoustical location transducers or the like.

Notwithstanding the foregoing, this position determination method functions particularly well with the above described continuous recording method. Because a unit is already recording data as it is discharged into the top of the water column, x, y and z positional information is easily recorded on the unit and becomes part of the unit's complete data record.

Figure 20:
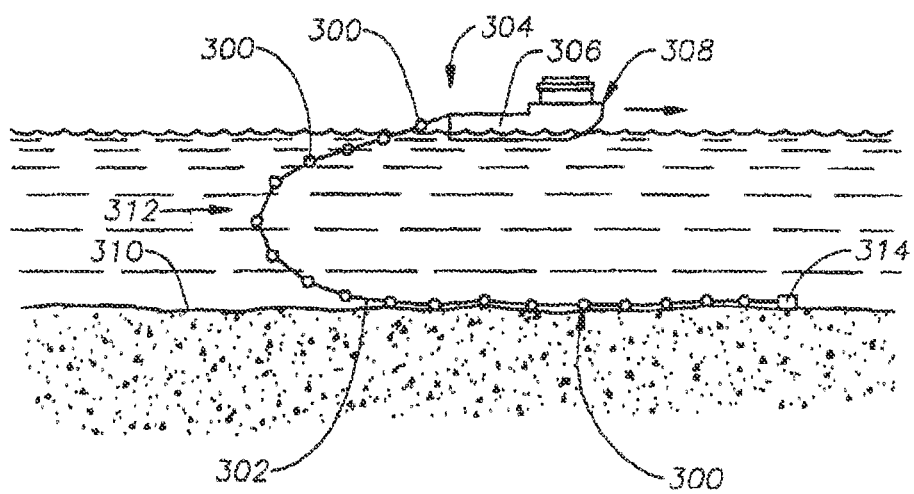
FIG. 20 illustrates an over-the-stern pod retrieval method.

The invention also provides for a unique retrieval method for OBS units 300 attached to a cable 302, as illustrated in FIG. 20. Specifically, it has been found that retrieving cable 302 over the trailing end 304 (generally the stern) of a vessel 306 as the vessel moves leading end 308 (often the vessel bow) first down a cable 302 in the direction of the cable minimizes dragging of the cable on the ocean floor 310 as the cable 302 is taken up and prevents undue tension or "pulling" of the cable 302 common in the prior art retrieval technique. Specifically, the water drag on the OBS units and cable in the method of the invention causes the cable 302 to parachute or billow out behind vessel 306, as shown at 312, utilizing the water column as a shock absorber and minimizing undue tension.

In this method, regulation of the speed of the vessel 306 is not as critical as in the prior art over-the-bow retrieval method. Furthermore, because the cable 302 is billowed out 312 in the water behind the vessel as the vessel moves in the opposite direction from the billow, the cable is less likely to become entangled in the vessel's propellers as may occur using the prior art method. Of course, those skilled in the art will understand that in the method of the invention, cable can be taken up over the bow or the stern Of the vessel as long as the vessel is moving in a direction along the cable and the cable is being taken up by the trailing end of the vessel.

In any event, a flotation release system 314 may also be attached to the cable, generally at one or both ends of the deployed cable, to cause at least a portion of the cable to rise to the surface where it can be easily snagged for retrieval utilizing the above described method. Such a system is well known in the art and may include a flotation device that is released from near the ocean floor at the desired time of retrieval or a flotation device that floats on the water surface but remains attached to the cable while deployed.

Figure 21:
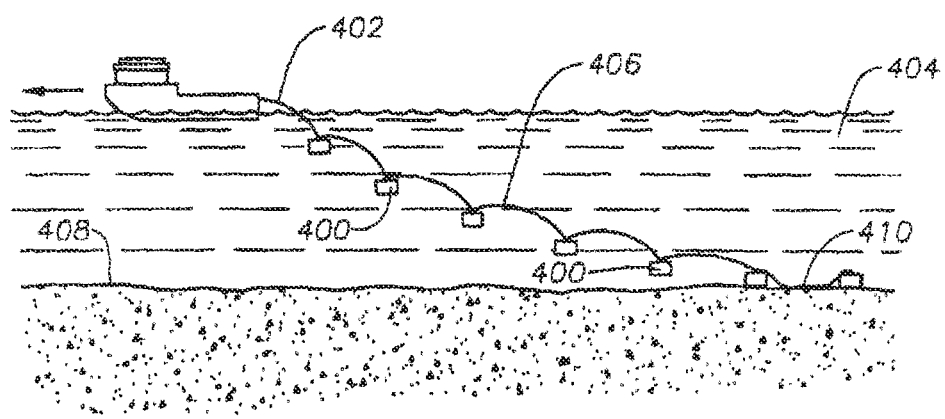
FIG. 21 illustrates multiple units attached to a non-rigid line during deployment.

The non-rigid cable of the invention is also incorporated in a unique deployment method for the pods, as illustrated in FIG. 21. Specifically, at least two OBS units 400 are tethered together using a non-rigid cable 402. The cable 402 and units 400 are deployed into a water column 404. Because the units 400 are of a much greater negative buoyancy than the non-rigid cable 402, the units will have a tendency to sink through the water column ahead of the cable such that the cable segment adjoining two units parachutes between the two units as shown at 406. The drag of the cable down through the water column functions as a break, slowing the descent of the units and permitting the placement of the units on the ocean floor 408 to be more readily controlled. Specifically, the parachuting effect permits control of the orientation of units such as those outfitted with the wedge shaped bumper illustrated in FIGS. 6 and 7, furthermore, the non-rigid cable cause the unit to gently settle on the ocean floor, allowing for consistent coupling of the units to the ocean floor.

This is an improvement over the prior art methods because the prior art methods utilize a rigid or semi-rigid cable for deployment of OBS units. Such cable has a tendency to sink quickly through the water column along with the units. In other words, such cables do not have the same drag characteristics as the lighter weight, non-rigid cable of the invention. In cable and OBS units utilizing this prior art method, the orientation of individual units is much more likely to destabilize, e.g., wobble off course or flip over, as the unit quickly passes through the water column.

An additional benefit to the deployment method of the invention is that the non-rigid cable permits slack to form between adjacent units, both during deployment and once settled on the ocean floor. In fact, it has been found that during general deployment operations such as described above, the length of the non-rigid cable between two units will generally be much greater than the actual spacing between the units once resting on the ocean floor. In other words, once settled on the ocean floor, there may be a great deal of slack in non-rigid cable between adjacent units. For this reason, the non-rigid cable of the invention is not utilized to space units apart from one another. In any event, a vessel operator can utilize the slack that forms in the non-rigid cable to cause correction to a receiver line as it is being laid. Specifically, if a deployment vessel drifts or otherwise causes a receiver line being laid to be positioned off of the desired receiver line, the vessel at the surface can reposition to cause the remainder of the non-rigid cable and attached units to begin settling back on the desired receiver line. The slack in the cable resulting from the non-rigid nature of the cable permits the operator to get back on line and cause the remainder of the individual units to settle in approximately their desired location along the intended line. In contrast, if such units were attached to a rigid or semi-rigid cable, the cable would not have any adjustment slack and the remainder of the units, while perhaps positioned along the desired receiver line, would not be positioned in the desired location along the receiver line. Furthermore, once the units 400 are in position on the ocean floor, the cable 402 between them is slack, as shown at 410. This "decouples" individual units from one another and prevents strumming or transmission of undesired noise along the cable.

To the extent clock 20 is a crystal clock, information from the tilt meter 38 may be used to correct for gravitational effects on clock timing. In the prior art, tilt meter information has only been used to correct seismic data. Other than crystal clock corrections to account for temperature effects, no other type of crystal corrections have been made to such clocks. Thus, one aspect of the invention utilizes tilt meter information to correct inaccuracies in the clock timing arising from gravitational effects acting on the crystal clock. Such clock correction can be carried out on-board the pod at or near the time of data recording, or applied to the data once the data has been extracted from the pod.

Likewise, information from the tilt meter 38 can be used to apply mathematical gimballing to the seismic data. To the extent seismic data has been corrected in the prior art to adjust for orientation, such correction has been based on mechanical gimbals installed on board the prior art OBS systems. However, a typical mechanical gimbal can cause deterioration in the data fidelity due to dampening of the gimbal in its carriage. In one aspect of the invention, it has been determined that a non-gimballed, mathematical correction, or "mathematical gimballing" is desirable over the gimballing methods of the prior art. Thus, the invention may utilize tilt meter information to mathematically adjust the seismic data to account for vertical orientation of the pod. Such mathematical gimballing can be carried out on-board the pod at or near the time of data recording, or may be applied to data once it has been extracted from the pod.

In addition, information from compass 36 can be used to further refine the mathematical gimballing to account for rotational orientation of the unit. Specifically, compass data can be incorporated with the tilt meter data in mathematical gimballing to more fully correct seismic data for effects arising from orientation of a pod.

What is claimed is:

1. An ocean bottom seismic data collection system comprising:
    a plate having a diameter, the plate configured to contact an ocean bottom to allow a seismic wave to pass through the plate via the ocean bottom;
    a wall coupled to the plate to form a disk-shaped case, the diameter of the plate greater than a height of the wall;
    a geophone disposed within the disk-shaped case to detect seismic signals;
    a power source disposed within the disk-shaped case;
    an on-board clock disposed within the disk-shaped case;
    a seismic data recorder disposed within the disk-shaped case to record the seismic signals;
    a water-tight compartment disposed within the disk-shaped case, the water-tight compartment enclosing at least one of the geophone, the power source, the on-board clock, or the seismic data recorder;
    an electronic hardware component disposed on a first portion of a periphery of the disk-shaped case; and
    a coupling mechanism disposed on a second portion of the periphery of the disk-shaped case, the coupling mechanism disposed on the second portion of the periphery of the disk-shaped case to form a radial axis that extends from a center of the disk-shaped case through the coupling mechanism that is separated by a predetermined angle from a radial axis that extends from the center of the disk-shaped case through the electronic hardware component,
    wherein the system has a negative buoyancy.

2. The system of claim 1, wherein the plate is circular.

3. The system of claim 1, wherein the wall is circular.

4. The system of claim 1, further comprising a second plate.

5. The system of claim 1, further comprising a second plate coupled to the wall opposite from the plate.

6. The system of claim 1, wherein the disk-shaped case is a low profile case.

7. The system of claim 1, wherein the geophone is disposed within the water-tight compartment.

8. The system of claim 1, wherein the power source is disposed within the water-tight compartment.

9. The system of claim 1, wherein the on-board clock is disposed within the water-tight compartment.

10. The system of claim 1, wherein the seismic data recorder is disposed within the water-tight compartment.

11. A method of deploying ocean bottom seismic units comprising:
    deploying, by a cable engine from a cable container, a first portion of cable below a surface of water;
    positioning an ocean bottom seismic unit adjacent a second portion of the cable above the surface of the water, the ocean bottom seismic unit including:
        a plate having a diameter, the plate configured to contact an ocean bottom to allow a seismic wave to pass through the plate via the ocean bottom;
        a wall coupled to the plate to form a disk-shaped case, the diameter of the plate greater than a height of the wall;
        a geophone disposed within the disk-shaped case to detect seismic signals;
        a power source disposed within the disk-shaped case;
        a clock disposed within the disk-shaped case;
        a seismic data recorder disposed within the disk-shaped case to record the seismic signals; and
        a water-tight compartment disposed within the disk-shaped case, the water-tight compartment enclosing at least one of the geophone, the power source, the clock, or the seismic data recorder,
        wherein the ocean bottom seismic unit has a negative buoyancy;
    attaching, via a coupling mechanism, the ocean bottom seismic unit at the second portion of the cable;
    deploying the ocean bottom seismic unit into the water via the cable; and
    controlling a movement of the ocean bottom seismic unit to place the ocean bottom seismic unit on the ocean bottom.

12. The method of claim 11, further comprising:
    attaching, via a clamp mechanism, the ocean bottom seismic unit at the second portion of the cable.

13. The method of claim 11, further comprising:
    attaching a sleeve to the second portion of the cable; and attaching the ocean bottom seismic unit to the sleeve.

14. The method of claim 13, further comprising:
    receiving, at a third portion of the cable below the surface of the water, the sleeve from the second portion of the cable.

15. The method of claim 13, further comprising:
    securing, via a pin, the sleeve to the second portion of the cable.

16. The method of claim 13, further comprising:
    attaching the sleeve to the second portion of the cable such that the sleeve slides on the cable.

17. The method of claim 11, further comprising:
    attaching, by a latch, the ocean bottom seismic unit to the cable.

18. The method of claim 17, wherein a portion of the latch is attached to a portion of the ocean bottom seismic unit.

19. The method of claim 18, wherein a major axis of the latch is non-intersecting with a z-axis of the ocean bottom seismic unit.

20. The method of claim 11, further comprising:
    slowing, by the cable, a descent of the ocean bottom seismic unit through the water, the ocean bottom seismic unit having a greater negative buoyancy than the cable.

* * * * *